US012571254B2

(12) United States Patent
Drifka et al.

(10) Patent No.: US 12,571,254 B2
(45) Date of Patent: Mar. 10, 2026

(54) DOOR ASSEMBLY HAVING A SOFT BOTTOMED DOOR PANEL AND SYSTEM AND METHOD OF DRIVING THE SAME

(71) Applicant: Rytec Corporation, Jackson, WI (US)

(72) Inventors: Brian Norbert Drifka, Richfield, WI (US); Seth Edward Kampa, Cedarburg, WI (US); Gabriel John Biertzer, West Bend, WI (US)

(73) Assignee: Rytec Corporation, Jackson, WI (US)

( * ) Notice: Subject to any disclaimer, the term of this patent is extended or adjusted under 35 U.S.C. 154(b) by 220 days.

(21) Appl. No.: 16/698,409

(22) Filed: Nov. 27, 2019

(65) Prior Publication Data

US 2020/0173231 A1 Jun. 4, 2020

Related U.S. Application Data

(60) Provisional application No. 62/773,863, filed on Nov. 30, 2018.

(51) Int. Cl.

*E06B 9/58* (2006.01)
*E06B 9/13* (2006.01)
*E06B 9/70* (2006.01)

(52) U.S. Cl.

CPC ................ *E06B 9/581* (2013.01); *E06B 9/13* (2013.01); *E06B 2009/583* (2013.01); *E06B 9/70* (2013.01)

(58) Field of Classification Search

CPC ... E06B 9/581; E06B 9/13; E06B 9/70; E06B 2009/583; E06B 9/17; E06B 9/11; E06B 9/58; E06B 9/54; A47G 5/02

See application file for complete search history.

(56) References Cited

U.S. PATENT DOCUMENTS 436,900 A 9/1890 Morrison
528,071 A 10/1894 Branshaw
(Continued)

FOREIGN PATENT DOCUMENTS

EP 0 264 220 4/1988
EP 0 405 093 1/1991
(Continued)

OTHER PUBLICATIONS

International Search Report and Written Opinion in related International App. No. PCT/US2019/063700 dated Feb. 20, 2020, 10 pages.

(Continued)

*Primary Examiner* — Johnnie A. Shablack
*Assistant Examiner* — John W Hanes, Jr.
(74) *Attorney, Agent, or Firm* — Schroeder Intellectual Property Law Group, LLC

(57) ABSTRACT

A door assembly having a door panel fixed proximate a top edge of the door panel to a rotatable drum. The door assembly includes a first and a second side column, each positioned proximate a doorway which is opened and closed by the door panel. Each side column includes a guide track positioned to guide one of the first or the second vertical edge of the door panel as the door panel is moved. A first column of drive teeth is positioned along the first vertical edge and a second column of drive teeth positioned along the second vertical edge, wherein each of the first column of drive teeth and the second column of drive teeth are formed by a plurality of adjacent drive teeth, each drive tooth in each plurality of drive teeth abutting an adjacent drive tooth as the door panel is wound and unwound from the drum.

31 Claims, 11 Drawing Sheets

(56) References Cited

U.S. PATENT DOCUMENTS

| | | | |
|---|---|---|---|
| 755,675 | A | 3/1904 | Kirby, Jr. |
| 766,541 | A | 8/1904 | Spiegle |
| 1,393,405 | A | 10/1921 | Soteros et al. |
| 1,405,618 | A | 2/1922 | Nelson |
| 1,749,180 | A | 3/1930 | Dixson |
| 1,764,880 | A | 6/1930 | Nelson |
| 1,766,730 | A | 6/1930 | Traut |
| 1,796,760 | A | 3/1931 | Norquist et al. |
| 1,832,387 | A | 11/1931 | Hansen |
| 1,866,788 | A | 7/1932 | Arthur |
| 1,914,431 | A | 6/1933 | Jacobs et al. |
| 1,925,578 | A | 9/1933 | Traut |
| 1,972,182 | A | 9/1934 | Chamberlain, Jr. et al. |
| 1,997,846 | A | 4/1935 | Armstrong |
| 2,126,782 | A | 8/1938 | Julien |
| 2,350,288 | A | 5/1944 | Michelman |
| 2,572,334 | A | 10/1951 | Guibert |
| 2,797,652 | A | 7/1957 | Waddell |
| 2,803,297 | A | 8/1957 | Wenke |
| 2,862,399 | A | 12/1958 | Wald, Jr. et al. |
| 3,149,665 | A | 9/1964 | Handford |
| 3,421,568 | A | 1/1969 | Youngs |
| 3,430,677 | A | 3/1969 | Pierce |
| 3,439,551 | A | 4/1969 | Militana |
| 3,489,200 | A | 1/1970 | Recchione |
| 3,796,010 | A | 3/1974 | Carlson |
| 3,864,203 | A | 2/1975 | Marzocchi |
| 3,996,814 | A | 12/1976 | Westlake |
| 4,016,920 | A | 4/1977 | Shepard |
| 4,222,282 | A | 9/1980 | Taig |
| 4,357,978 | A | 11/1982 | Keller et al. |
| 4,478,268 | A | 10/1984 | Palmer |
| 4,586,552 | A | 5/1986 | Labelle |
| 4,601,320 | A | 7/1986 | Taylor |
| 4,601,321 | A | 7/1986 | Tokui et al. |
| 4,609,981 | A | 9/1986 | Gamba |
| 4,649,981 | A | 3/1987 | Bibeau |
| 4,690,195 | A | 9/1987 | Taylor |
| 4,884,617 | A | 12/1989 | Coenraets |
| 4,887,660 | A | 12/1989 | Kraus |
| 4,987,943 | A | 1/1991 | Charest |
| 5,058,651 | A | 10/1991 | Ashley et al. |
| 5,090,468 | A | 2/1992 | Tedeschi |
| 5,123,474 | A | 6/1992 | Smith |
| 5,131,450 | A | 7/1992 | Lichy |
| 5,139,074 | A | 8/1992 | Warner |
| 5,141,043 | A | 8/1992 | Kraeutler |
| 5,150,631 | A | 9/1992 | Faerber et al. |
| 5,163,495 | A | 11/1992 | Lichy |
| 5,170,833 | A | 12/1992 | Taylor et al. |
| 5,172,744 | A | 12/1992 | Finch et al. |
| 5,219,015 | A | 6/1993 | Kraeutler |
| 5,222,541 | A | 6/1993 | Hornberger |
| 5,271,182 | A | 12/1993 | Greisner et al. |
| 5,271,448 | A | 12/1993 | Delgado |
| 5,284,199 | A | 2/1994 | Finch et al. |
| 5,307,857 | A | 5/1994 | Kreutler |
| 5,351,742 | A | 10/1994 | Lichy |
| 5,365,993 | A | 11/1994 | Jella |
| 5,379,823 | A | 1/1995 | Kraeutler |
| 5,392,836 | A | 2/1995 | West et al. |
| 5,445,209 | A | 8/1995 | Lichy |
| 5,450,890 | A | 9/1995 | Gruben et al. |
| 5,482,104 | A | 1/1996 | Lichy |
| 5,526,865 | A | 6/1996 | Coenraets |
| 5,544,690 | A | 8/1996 | Magro et al. |
| 5,601,133 | A | 2/1997 | Krupke et al. |
| 5,632,317 | A | 5/1997 | Krupke et al. |
| 5,655,591 | A | 8/1997 | Knutson |
| 5,657,805 | A | 8/1997 | Magro |
| 5,722,476 | A | 3/1998 | Lujan-Sanchez et al. |
| 5,878,803 | A | 3/1999 | Kraeutler |
| 5,964,270 | A | 10/1999 | Kirkey et al. |
| 5,964,271 | A | 10/1999 | Lapointe |
| 6,039,106 | A | 3/2000 | Gontarski et al. |
| 6,065,525 | A | 5/2000 | Wells |
| 6,068,040 | A | 5/2000 | Magro et al. |
| 6,089,305 | A | 7/2000 | Gruben et al. |
| 6,152,208 | A | 11/2000 | Kalempa et al. |
| 6,247,517 | B1 | 6/2001 | Drifka et al. |
| 6,257,303 | B1 | 7/2001 | Coubray et al. |
| 6,296,039 | B1 | 10/2001 | Mullet et al. |
| 6,341,639 | B1 | 1/2002 | Mullet et al. |
| 6,357,507 | B1 | 3/2002 | Stoebich et al. |
| 6,390,171 | B2 | 5/2002 | Drifka et al. |
| 6,394,172 | B1 | 5/2002 | Kessous |
| 6,431,250 | B2 | 8/2002 | Mullet et al. |
| 6,574,832 | B1 | 6/2003 | Boerger et al. |
| 6,722,416 | B2 | 4/2004 | Varley et al. |
| 6,792,998 | B2 | 9/2004 | David |
| 6,915,832 | B2 | 7/2005 | Stern, Jr. |
| 6,942,003 | B2 | 9/2005 | Thompson |
| 6,959,748 | B2 | 11/2005 | Hudoba |
| 7,028,738 | B2 | 4/2006 | Ceccofiglio |
| 7,028,741 | B2 | 4/2006 | Coenraets |
| 7,036,549 | B2 | 5/2006 | Coenraets |
| 7,128,125 | B2 | 10/2006 | Harbison |
| 7,131,481 | B2 | 11/2006 | Varley et al. |
| 7,231,953 | B2 | 6/2007 | Varley et al. |
| 7,275,581 | B2 | 10/2007 | Coenraets |
| 7,416,014 | B2 | 8/2008 | Coenraets |
| 7,464,743 | B1 | 12/2008 | Berger, Jr. |
| 7,516,770 | B2 | 4/2009 | Jerry |
| 7,581,578 | B2 | 9/2009 | Coenraets |
| 7,665,506 | B2 | 2/2010 | Coenraets |
| 7,748,431 | B2 | 7/2010 | Jansen et al. |
| 7,793,702 | B2 | 9/2010 | Biewer et al. |
| 7,841,377 | B2 | 11/2010 | Coenraets |
| 8,109,317 | B2 * | 2/2012 | Bostyn .................... E06B 9/581 160/273.1 |
| 8,113,265 | B2 | 2/2012 | Hardison, III et al. |
| 8,291,960 | B2 | 10/2012 | Bowman |
| 8,316,915 | B2 | 11/2012 | Drifka et al. |
| 8,360,132 | B2 | 1/2013 | Drifka |
| 8,602,081 | B2 | 12/2013 | Komatsu et al. |
| 8,607,842 | B2 | 12/2013 | Drifka |
| 8,622,112 | B2 | 1/2014 | Tremaine, III et al. |
| 8,627,605 | B2 | 1/2014 | Drifka |
| 8,671,541 | B2 | 3/2014 | Coenraets |
| 8,672,014 | B2 | 3/2014 | Coenraets |
| 8,807,195 | B2 | 8/2014 | Coenraets |
| 8,851,147 | B2 | 10/2014 | Drifka et al. |
| 8,863,815 | B2 | 10/2014 | Jansen et al. |
| 8,887,790 | B2 | 11/2014 | Drifka |
| 8,935,883 | B2 | 1/2015 | Coubray et al. |
| 9,097,053 | B2 | 8/2015 | Drifka |
| 9,186,427 | B2 | 11/2015 | Drifka |
| 9,187,953 | B2 | 11/2015 | Drifka et al. |
| 9,260,911 | B2 | 2/2016 | Gontarski et al. |
| 9,322,212 | B2 | 4/2016 | Drifka |
| 9,410,363 | B2 | 8/2016 | Knutson |
| 9,493,948 | B1 | 11/2016 | Davidson et al. |
| 9,702,665 | B1 | 7/2017 | Rose, Jr. et al. |
| 9,765,567 | B2 | 9/2017 | Drifka et al. |
| 2002/0139491 | A1 | 10/2002 | Langenbach |
| 2003/0079845 | A1 | 5/2003 | Stern, Jr. |
| 2005/0211391 | A1 | 9/2005 | Varley et al. |
| 2005/0211397 | A1 | 9/2005 | Coenraets |
| 2005/0252623 | A1 | 11/2005 | Mctavish et al. |
| 2006/0144530 | A1 | 7/2006 | Nargare et al. |
| 2006/0248819 | A1 * | 11/2006 | Coenraets ................. E06B 9/13 52/202 |
| 2007/0131358 | A1 | 6/2007 | Wasaki et al. |
| 2008/0035282 | A1 | 2/2008 | Coenraets |
| 2008/0093037 | A1 | 4/2008 | Kraeutler |
| 2009/0145559 | A1 | 6/2009 | Glasl et al. |
| 2009/0229767 | A1 | 9/2009 | Mullet et al. |
| 2010/0000692 | A1 | 1/2010 | Coenraets |
| 2010/0288452 | A1 | 11/2010 | Coenraets |
| 2010/0326607 | A1 | 12/2010 | Kitani et al. |
| 2011/0259530 | A1 | 10/2011 | Brook et al. |
| 2012/0036955 | A1 | 2/2012 | Gogola |
| 2012/0325416 | A1 | 12/2012 | Hayashiguchi |

(56) References Cited

U.S. PATENT DOCUMENTS

| | | | |
|---|---|---|---|
| 2013/0180673 | A1 | 7/2013 | Hashimshony et al. |
| 2014/0158313 | A1 | 6/2014 | Mctavish et al. |
| 2017/0159358 | A1 | 6/2017 | Fabregat |

FOREIGN PATENT DOCUMENTS

| | | | | |
|---|---|---|---|---|
| GB | 2 090 895 | | 7/1982 | |
| GB | 2 108 839 | | 5/1983 | |
| GB | 2 137 271 | | 10/1984 | |
| JP | 2000-160961 | | 6/2000 | |
| KR | 200256886 | * | 11/2001 | ............... E06B 9/58 |
| KR | 100698757 | * | 3/2007 | |
| WO | 99/02812 | | 1/1999 | |
| WO | 1999/050520 | | 10/1999 | |
| WO | 03/106805 | | 12/2003 | |
| WO | 03/106805 A1 | | 12/2003 | |

OTHER PUBLICATIONS

EPO Search Report in related EP Pat. App. No. 19890769.3 dated Aug. 5, 2022, 36 pages.

* cited by examiner

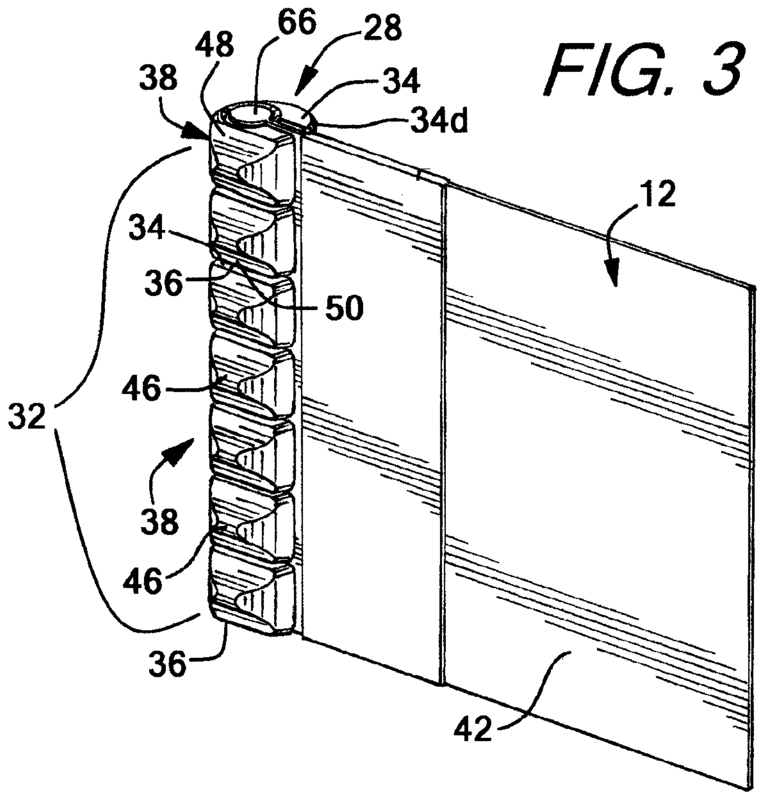
FIG. 3
FIG. 4
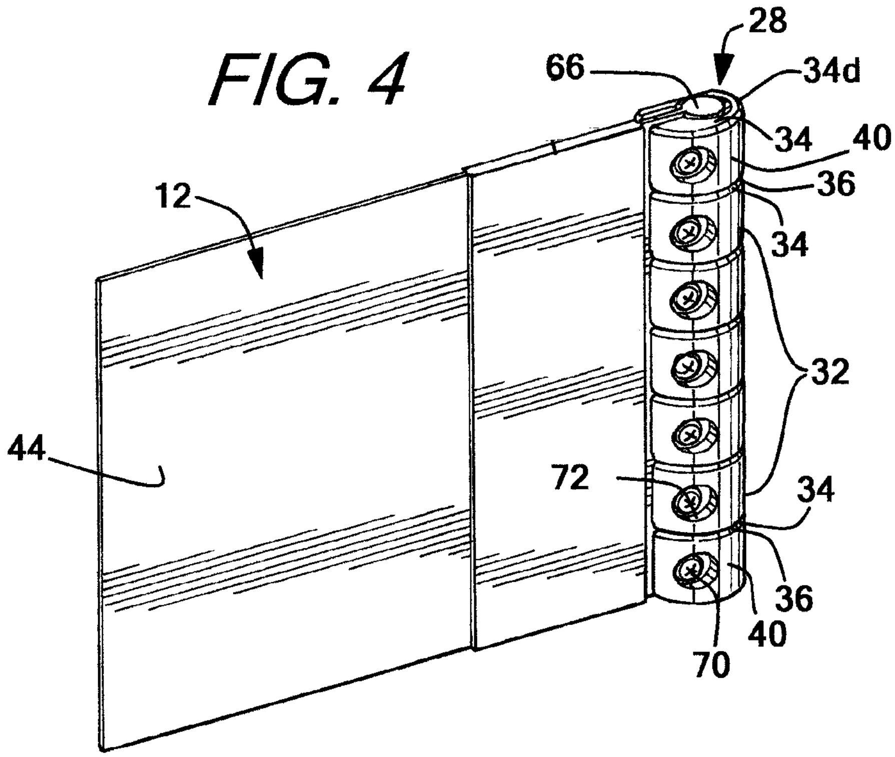

FIG. 5
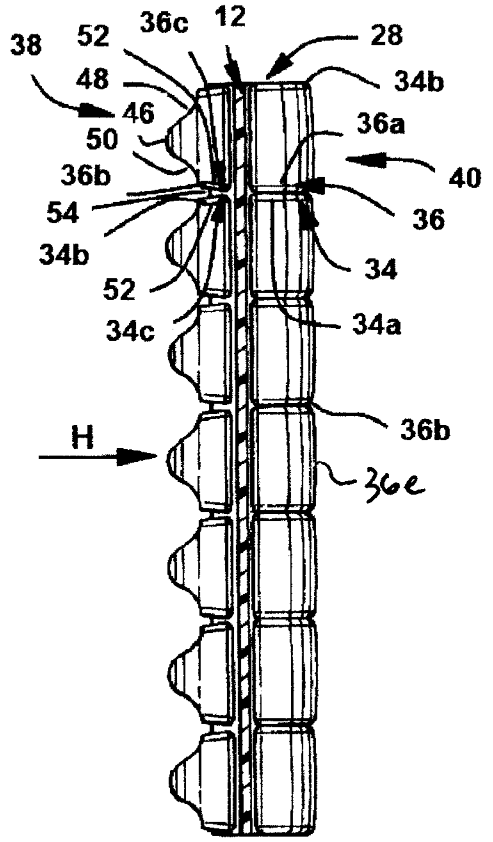
FIG. 6
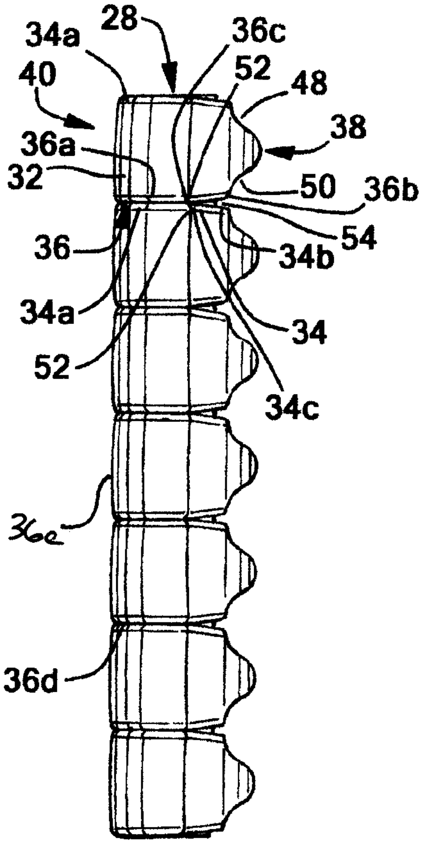
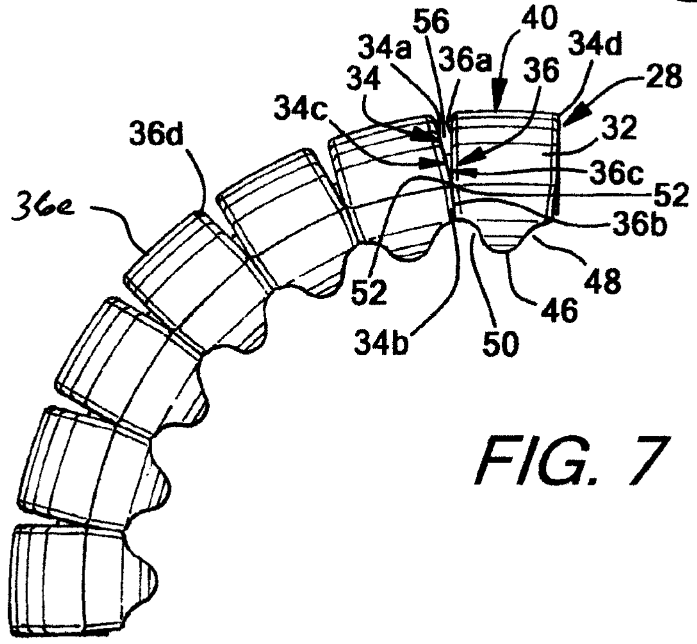
FIG. 7

FIG. 8
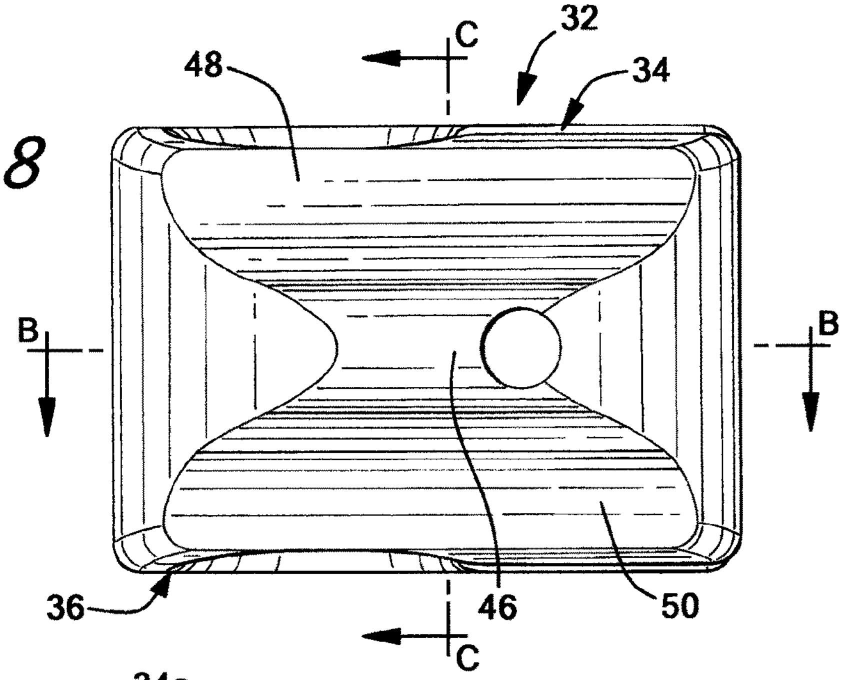
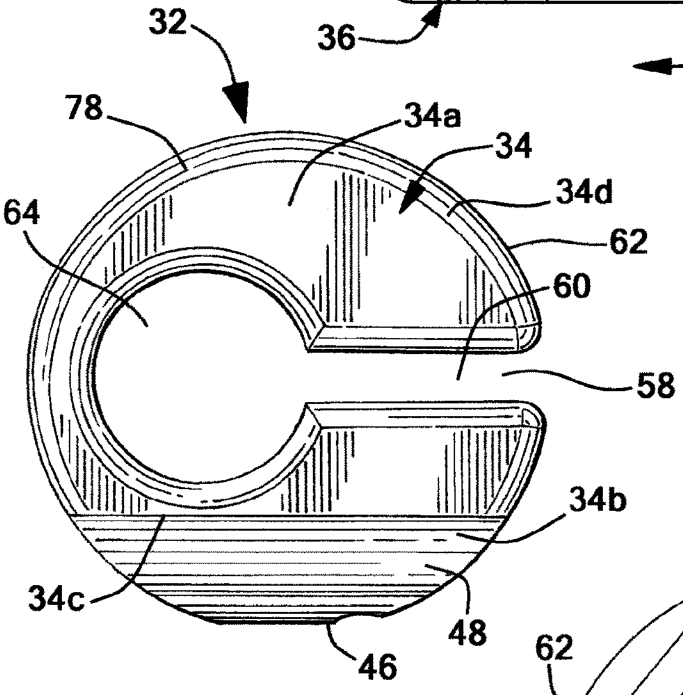
FIG. 9
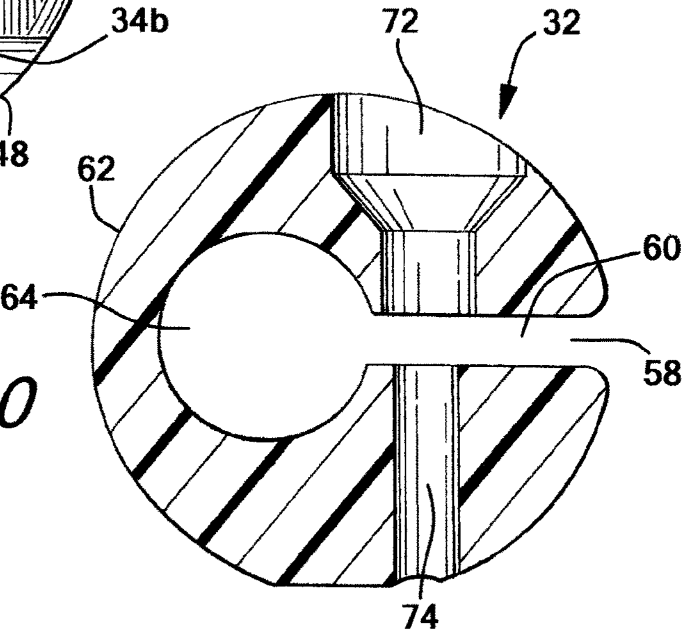
FIG. 10

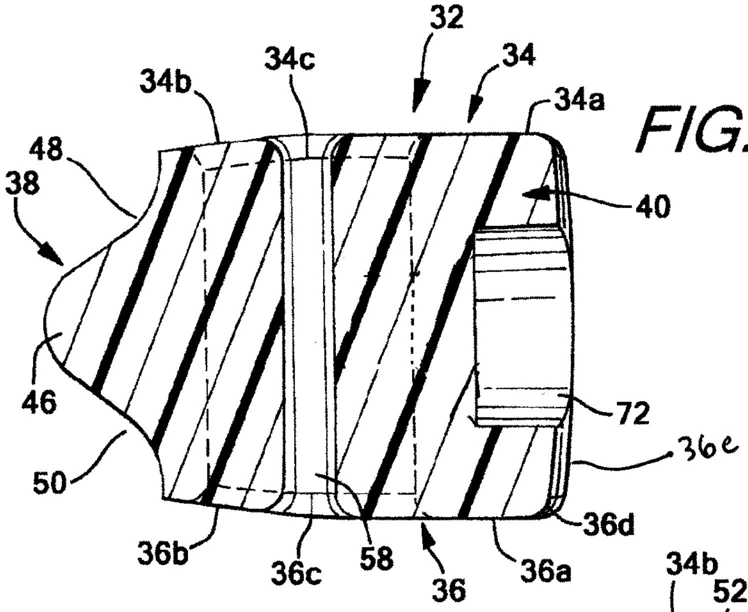
FIG. 11
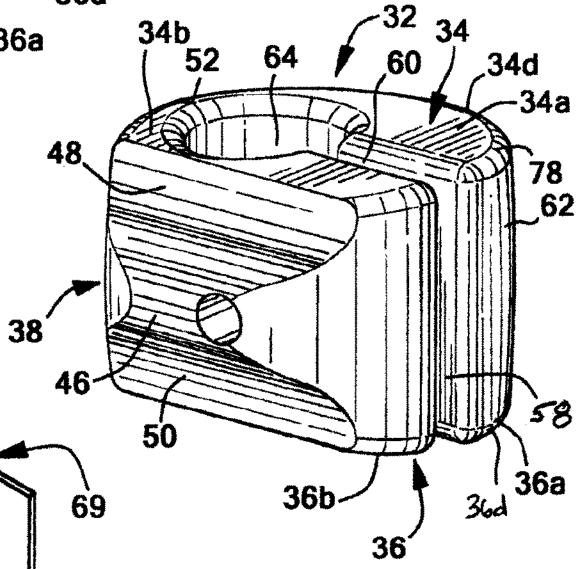
FIG. 12
FIG. 13
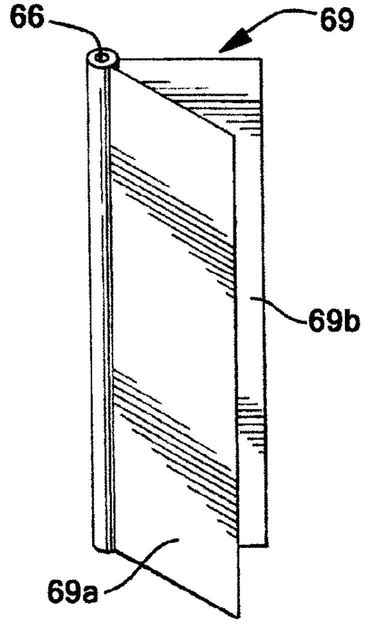
FIG. 14

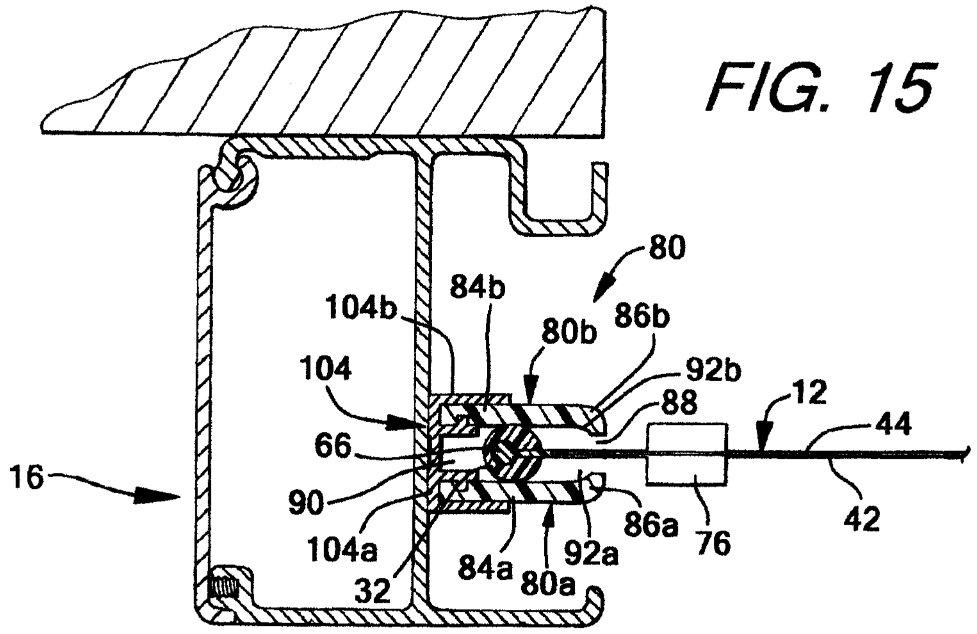
FIG. 15
FIG. 16
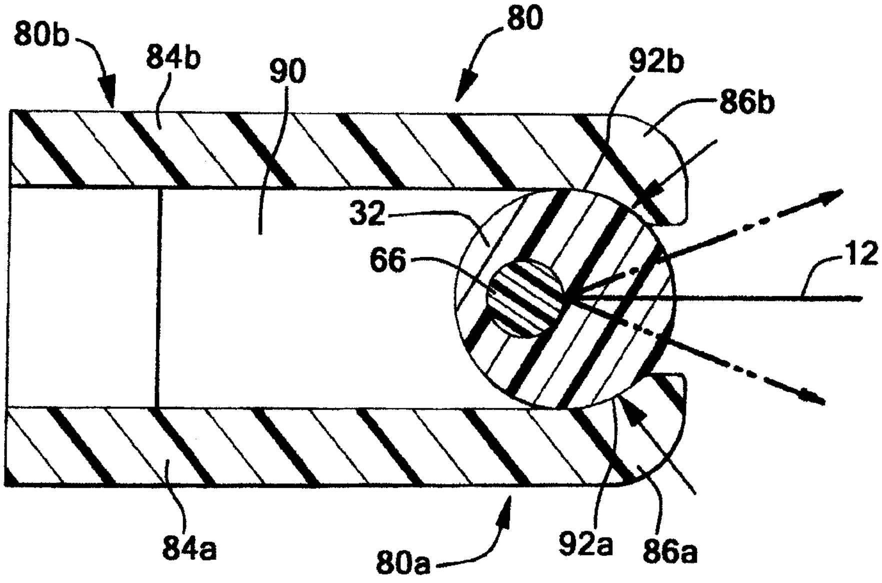

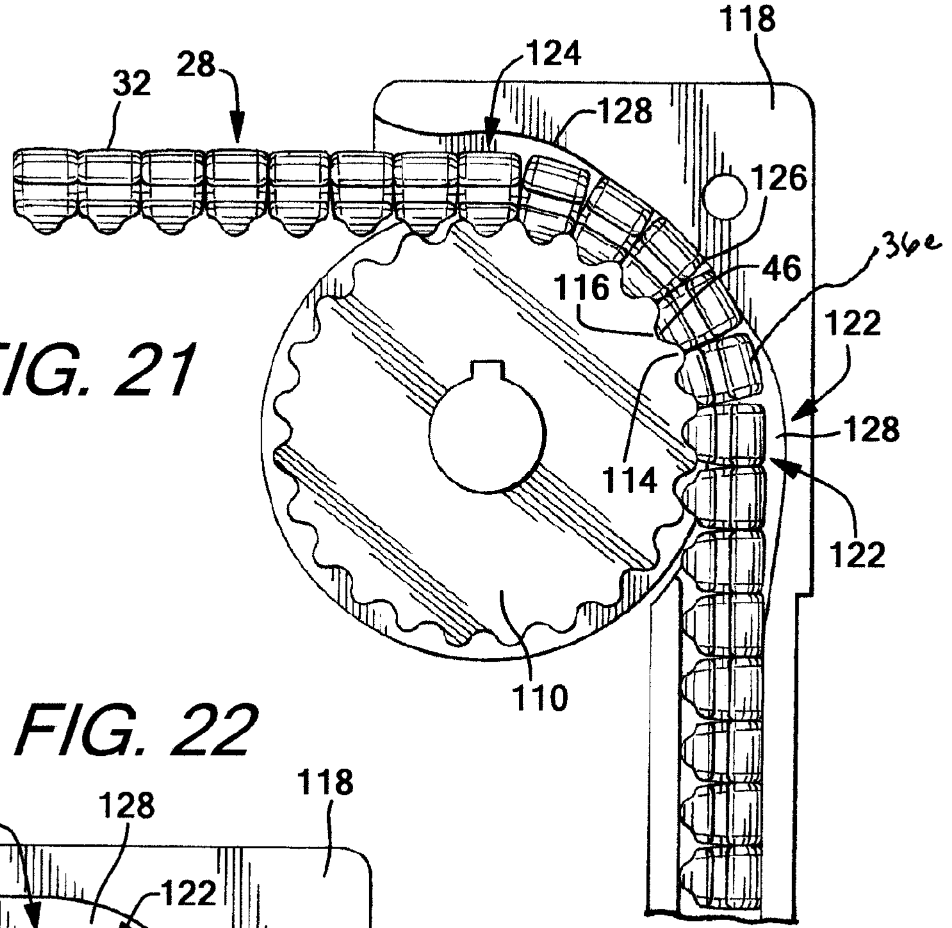
FIG. 21
FIG. 22
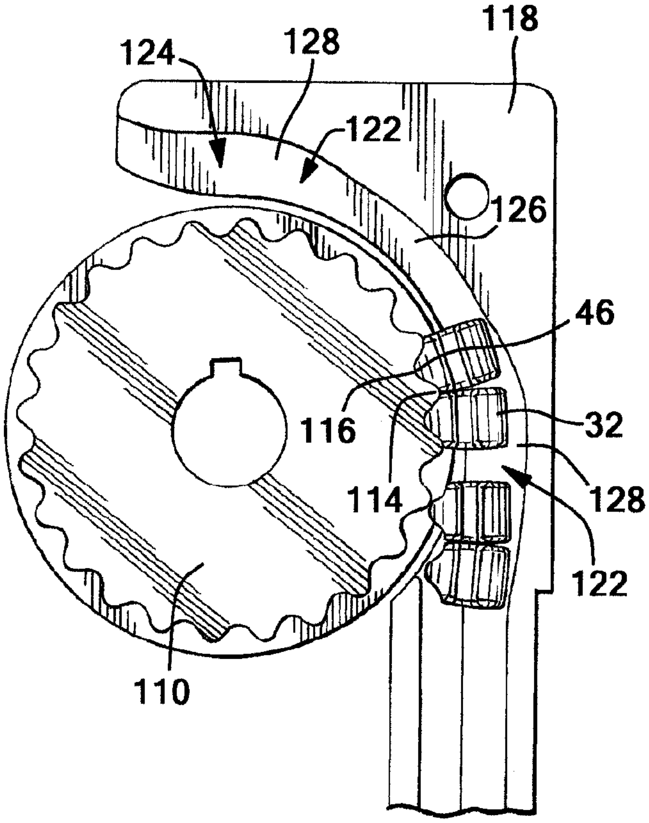
FIG. 23
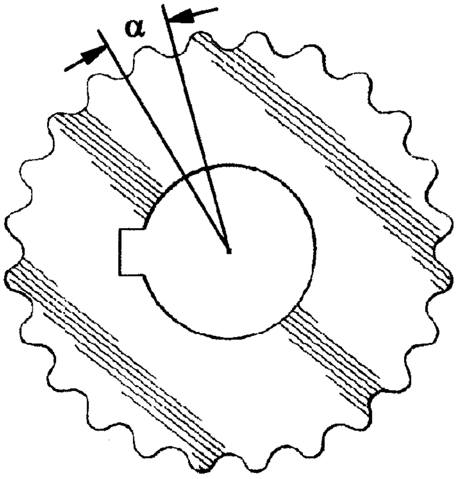

DOOR ASSEMBLY HAVING A SOFT BOTTOMED DOOR PANEL AND SYSTEM AND METHOD OF DRIVING THE SAME

RELATED APPLICATIONS

The present application claims priority to U.S. Provisional Patent Application No. 62/773,863 filed Nov. 30, 2018—the contents of which are fully incorporated herein by reference.

FIELD OF THE INVENTION

The present invention is directed to a door assembly and related components, wherein the door assembly includes a soft bottomed door panel, and a system for driving the same.

BACKGROUND OF THE INVENTION

Overhead roll-up door assemblies like those found in U.S. Pat. No. 8,607,842 typically include a flexible door panel which is guided within side columns and/or guide tracks positioned on opposite sides of a doorway as the flexible door panel is opened and closed. In order to move the door panel within the guide tracks and open and close the door, a drum and motor combination is typically provided, with the door panel being fixed at one end to the drum. The motor is typically mechanically coupled to the drum so that activation of the motor in a first direction causes the drum to rotate in a first direction, and activation of the motor in a second, reverse, direction causes the drum to rotate in a second direction. As the drum rotates in one direction, the first direction for example, the door panel will begin winding up on the drum, opening the doorway which was previously blocked by the door panel. As the drum rotates in the opposite direction, the second direction for example, the door panel will unwind from the drum, blocking the previously open doorway.

In order to prevent slack in the door panel as it opens and closes, particularly when constructing the door panel from lighter weight materials, a weighted bottom bar is attached to a lower end of the door panel so that the door panel remains taut in the guide tracks and doorway opening. Weighted bottom bars—along with thickened bodies placed proximate each lateral edge of the door panel—also help prevent wind pressure on one side of the door panel, or pressure differentials on opposing sides of the door panel, from causing the door panel to disengage the guide tracks as it opens, closes, or stops and remains static in a partially or fully closed position.

When thickened bodies are used along the lateral or vertical edges of the door panel to prevent the door panel from disengaging from a side column and/or guide track when a pressure differential or wind load is applied to the door panel, disengagement and subsequent reengagement of the door panel in response to an impact hit becomes more difficult. If, for example, the door panel is impacted by a vehicle in the partially closed position, in order to prevent damage to the door panel, side columns, guide tracks, and/or surrounding bodies and structures proximate the door assembly, it is advantageous if the door panel, including the thickened edges, can disengage from the side columns. When thickened bodies are utilized, the bodies can sometimes become wedged or stuck in the side columns, potentially damaging the motor used to open the door panel, the door panel itself, the thickened bodies, and/or side columns as the door panel continues to be pulled open while being jammed. Thickened bodies may also cause or increase unwanted friction with the side columns and/or guide tracks when the door is opened and/or closed in the presence of a wind load or a pressure differential, as the load on the door panel may cause the door to bow and the thickened bodies to contact and engage the side columns and/or guide tracks while the door panel is moving.

While weighted bottom bars are successful in facilitating the opening and closing of overhead roll-up door panels, and, along with thickened bodies along the edges in preventing such door panels from disengaging with associated guide tracks as a result of a wind load on one side of the door panel or pressure differential on opposing sides of the door panel, weighted bottom bars may cause damage if the door panel is closed on a person or object located beneath the panel. Safety systems have been developed in order to prevent such occurrences, however it would be advantageous to have a door assembly which utilizes a door panel which does not have a weighted bottom bar, but instead has a soft bottom edge while maintaining the tautness within the panel as the door opens and closes, as well as maintaining the wind load benefits realized from the use of a weighted bottom bar.

The present invention aims to provide such a system and method.

SUMMARY OF THE INVENTION

The present invention is directed to an overhead door assembly which includes a door panel guided within side columns as it is wound onto, and unwound off of, a drum to open and close a doorway positioned proximate the door assembly. The door panel includes a column of drive teeth aligned along each opposing vertical outer edge, with each drive tooth in each drive tooth column being configured to fit around and engage the vertical edge of the door panel. The door panel may further include a Keder fixed along each vertical edge to help facilitate engagement with the drive tooth columns.

Any Keder which is utilized with the present invention may include fabric or vinyl material wrapped around an elongated body, with the Keder having two flaps for connecting the Keder to an edge of the door panel in a manner such that the elongated body extends along an exterior edge (i.e. a vertical edge) of the door panel and/or is connected to form the outer vertical edge of the door panel. Within the fabric or vinyl material, the elongated body may be a polyvinyl chloride ("PVC") material, a steel cable, or the like.

According to one aspect of the invention, a door assembly is provided. The door assembly includes a door panel having a top edge, a bottom edge, a first vertical edge and a second vertical edge. The top edge of the door panel (and/or some portion of the door panel proximate thereto) is permanently fixed to a drum, with the drum being rotatable in a first direction and a second direction. Rotation of the drum in the first direction causes the door panel to wind onto the drum (open the door), while rotation of the drum in the second, opposite, direction causes the door panel to unwind from the drum (close the door). The door assembly further comprises a first side column and a second side column, wherein the first side column is positioned proximate a first side of a doorway which is opened and closed by the door panel, and the second side column is positioned proximate a second side of the doorway. Each of the first side column and the second side column include a guide track. Each guide track is positioned to guide one of the first vertical edge or the second vertical edge of the door panel as it opens and closes the doorway. A first column of drive teeth is positioned along the first vertical edge of the door panel, and a second column of drive teeth is positioned along the second vertical edge of the door panel, wherein each of the first column of drive teeth and the second column of drive teeth are formed by a plurality of adjacent individual drive teeth, with each drive tooth in each column abutting an adjacent drive tooth as the door panel is wound and unwound from the drum. By using a column of adjacent, abutting, drive teeth, the door assembly can be constructed without a bottom bar as the rigidness provided by each column of drive teeth, and the force of adjacent drive teeth abutting each other as the door opens and closes, creates an upwards and/or downwards force on the edges of the door panel and holds the door panel in a taut manner, while also providing rigidness to the door the edges of the door panel to prevent bending or flexing of the panel.

In order to further enhance the downward force of adjacent, abutting, drive teeth in each drive tooth column, and to help drive the door panel between the open and closed positions, the door assembly may further include a first drive sprocket being positioned proximate a top of the first side column and guide track (adjacent or located in close proximity above, and/or offset from, the top of the first side column and guide track) and a second drive sprocket positioned proximate a top of the second side column and guide track. The first drive sprocket may be positioned to engage the first column of drive teeth, and the second drive sprocket may be positioned to engage the second column of drive teeth, as the door panel is wound and unwound from the drum. The drive sprockets may be connected by a second drum, with at least one of the drive sprockets and/or the drum being connected to a motor to rotate and drive sprockets and drum.

Each drive tooth in the first column of drive teeth and the second column of drive teeth may include a toothed portion and a non-toothed portion in order to enhance the rigidity of any unwound portion of the drive tooth columns, promote flexibility of the wound portions of the drive tooth columns, and facilitate driving and engagement with any drive sprockets which are included in the assembly. Where each drive tooth includes a toothed portion and a non-toothed portion, each tooth in each column of drive teeth should be arranged so that the toothed portion of each drive tooth is aligned on a first side of the door panel, and the non-toothed portion of each drive tooth is aligned on a second side of the door panel.

In order to facilitate engagement between the individual drive teeth and the door panel, and to allow for replacement should a single drive tooth break, for example, each drive tooth in the first column of drive teeth and the second column of drive teeth may include an opening formed in the outer surface of the drive tooth. The opening in each drive tooth may provide access to an open channel extending vertically through the middle of the drive tooth, the opening and vertical channel being configured to facilitate engagement of each drive tooth with the first or second vertical edge of the door panel, while providing an opening and channel through which each individual drive tooth can be disengaged and removed from the door panel if necessary. Utilizing a channel and opening may allow each drive tooth to overlap the vertical edge and a portion of the door panel proximate the vertical edge, to further enhance or facilitate the connection between the drive tooth and the door panel, as well as to enhance the rigidity of the each of the door panel, and therefore the tautness of the entire door panel. The overlap may also facilitate clamping of each drive tooth on the door panel should any drive tooth become engaged with the guide track.

In order to further facilitate the connection between the drive tooth columns and the door panel, the door panel may further include two Keders, with a first Keder being positioned along or forming the first vertical edge of the door panel, and a second Keder being positioned along or forming the second vertical edge of the door panel. Each of the first and second Keders may include an elongated body and a flap, the elongated body extending vertically along an outside edge of the door panel along the first or second vertical edge of the door panel, with the flap being fixed to the door panel to hold the Keder in place. The first column of drive teeth may be configured to engage the first Keder and the second column of drive teeth may be configured to engage the second Keder. In order to yet further facilitate engagement of each drive tooth with the Keder, the elongated body (and any overlapping material) of the Keder may have a dimension (i.e. width or diameter) which substantially matches an identical dimension formed in the open channel extending vertically through the middle of each drive tooth. In order to further enhance the engagement, the opening in the outer surface of each drive tooth leading to the open channel may be configured to have a smaller dimension (i.e. width) than the dimension of both the open channel and elongated body (plus any overlapping material) of the Keder. The elongated body may be a metal or wire cable, for example. Each drive tooth may also be fastened to the elongated body by a fastener such as a screw, bolt, rivet, nail, or similar fastener.

In order to further enhance the stiffness of each drive tooth column, and consequently the stiffness imparted on the door, each drive tooth in the first column of drive teeth and the second column of drive teeth may have a flat or planar top portion and a flat or planar bottom portion. The flat top portion of at least a plurality of the drive teeth may abut the flat bottom portion of any adjacent drive tooth in the first or second drive tooth column when the door panel is substantially unwound from the drum. The top and bottom flat portions of the drive teeth will abut each other as the door panel opens and closes, and in particular those drive teeth located within the first and second guide tracks, generating a downwards and/or upwards force on the adjacent tooth, helping to maintain tautness as the door opens and closes. An outer edge of the flat or planar top portion and an outer edge of the flat or planar bottom portion of each drive tooth may be rounded. The bottom portion of each drive tooth, in addition to or in the alternative of being flat, may include a projection which abuts and engages an adjacent flat top portion in order to create a further upwards and/or downwards force within the column of drive teeth.

To help facilitate the rolling of the drive tooth columns when the door panel is partially or fully wound on the drum, each drive tooth in the first column of drive teeth and the second column of drive teeth may also further include an angled or second planar top portion and an angled or second planar bottom portion. The angled top portion of each drive tooth may connect to the flat top portion, and extend in a plane at an angle thereto, at a top pivot point. Similarly, the angled bottom portion of each drive tooth may connect to the flat bottom portion, and extend in a plane at an upward angle to the flat portion from a bottom pivot point. The top angled portion and the bottom angled portions of each drive tooth may be configured in such a way that each angled portion extends at a downward or an upward angle to the respective flat portion from the respective pivot point towards the toothed portion of the drive tooth. The angle of the top and bottom angled portions from the respective pivot points to the respective toothed portions may create a plurality of gaps in each of the first and second drive tooth columns between adjacent teeth on the toothed side of the drive tooth columns. Each gap in the plurality of gaps may be formed between the top angled portion and the bottom angled portion of adjacent drive teeth in any unwound portion of each drive tooth column.

By providing a plurality of gaps in each column of drive teeth, a space is provided for each drive tooth to pivot and contact the adjacent drive tooth when the drive tooth columns are wound on the drum or flexed around a drive sprocket. At least a substantial portion of the plurality of gaps, i.e. at least all the teeth which are wound on the drum, are closed and each of the top angled portion and the bottom angled portion of each adjacent drive tooth in each drive tooth column abut each other when the door panel is substantially wound on the drum, i.e. the door panel is mostly or completely open.

In embodiments where a first and second guide sprocket is utilized, the door assembly may further include a first drive guide and a second drive guide to help facilitate proper (and aligned) engagement between the drive teeth and the guide sprockets. The first drive guide may partially surround the first guide sprocket and facilitate engagement between the first column of drive teeth and the first guide sprocket, and the second drive guide may partially surround the second guide sprocket and facilitate engagement between the second column of drive teeth and the second guide sprocket. To help ensure proper alignment and engagement, the first drive guide and the second drive guide may each include a drive channel, with each drive channel having a first recessed portion, a second recessed portion, and a narrowed portion, the narrowed portion being positioned between the first recessed portion and the second recessed portion. The first and second recessed portions at the beginning and end of the drive channel may allow for drive teeth which become misaligned with the guide sprocket and any guide sprocket teeth or gaps to enter into the recess before realigning with the sprocket and sprocket teeth or gaps.

In order to further help ensure proper alignment between the drive teeth and the drive sprocket, the drive channel of the first drive guide may be substantially aligned with the guide track of the first side column, and the drive channel of the second drive guide may be substantially aligned with the guide track of the second side column, wherein substantially aligned means in line or just slightly offset from the guide track.

The guide track of the first side column and the guide track of the second side column of the door assembly may each include a first track and a second track, with each side column further including a track holder. Each track holder may include a first support and a second support, with the first support of each track holder being coupled to the first track of the guide track of the respective side column, and the second support being coupled to the second track of the guide track of the respective side column.

Each track holder support may be made from a material more rigid than the first track and the second track. The first track and the second track of each guide track may extend laterally towards the interior of the doorway a first distance, and the first support and the second support of each track holder of each side column may extend laterally towards the interior of the doorway a second distance, wherein the first distance is greater than the second distance so that each track holder only partially overlaps the attached track.

The first track and the second track of each of the first and second guide tracks may include a curved portion, the curved portions defining a gap through which the door panel extends from the guide track into the doorway opening. The curved portions may each include a curved seat. The curved seat may match a geometry of each drive tooth in the first column of drive teeth and the second column of drive teeth. For example, the matching geometry may create a ball and socket interface.

According to another aspect of the invention, the first guide track and the second guide track may be constructed from flexible materials.

According to another aspect of the invention, the first guide track and the second guide track may be constructed using ultra-high molecular weight plastic or polymer.

According to another aspect of the invention, each drive tooth in the first column of drive teeth and each drive tooth in the second column of drive teeth may be fastened to the vertical edge of the door panel and/or any Keder positioned proximate the vertical edge, by a fastener.

Other advantages and aspects of the present invention will become apparent upon reading the following description of the drawings and detailed description of the invention.

BRIEF DESCRIPTION OF THE DRAWINGS

FIG. 3 shows a front perspective view of portion A of the door panel shown in FIG. 2;

FIG. 4 shows a back-perspective view of portion A of the door panel shown in FIG. 2;

FIG. 5 shows a cross-section view taken along line A-A of portion A of the door panel shown in FIG. 2;

FIG. 6 shows an exterior elevation of portion A of the door panel shown in FIG. 2;

FIG. 7 shows the exterior elevation of FIG. 6 when portion A of the door panel is wound;

FIG. 8 shows a front elevation of an embodiment of a drive tooth;

FIG. 9 shows a top view of the drive tooth shown in FIG. 8;

FIG. 10 shows a cross-section of an embodiment of the drive tooth shown in FIG. 8 taken along the line B-B;

FIG. 11 shows a cross-section of an embodiment of the drive tooth shown in FIG. 8 taken along the line C-C;

FIG. 12 shows a perspective view of an embodiment of the drive tooth shown in FIG. 8;

FIG. 13 shows an embodiment of a portion of Keder;

FIG. 14 shows an embodiment of a portion of Keder;

FIG. 15 shows a cross-section of the door assembly shown in FIG. 1A taken along line D-D;

FIG. 16 shows close up of an embodiment of the guide track of FIG. 15;

FIG. 21 is a close up of portion G of FIG. 20;

FIG. 22 is a close up of portion G of FIG. 20 having drive teeth removed from the drawing with a misaligned drive tooth; and FIG. 23 shows an isolated sprocket as contemplated by the present invention.

DETAILED DESCRIPTION OF THE PRESENT INVENTION

While the present invention is susceptible to embodiments in many different forms, there is described in detail herein, preferred embodiments of the invention with the understanding that the present disclosures are to be considered as exemplifications of the principles of the invention and are not intended to limit the broad aspects of the invention to the embodiments illustrated.

Figure 1A:
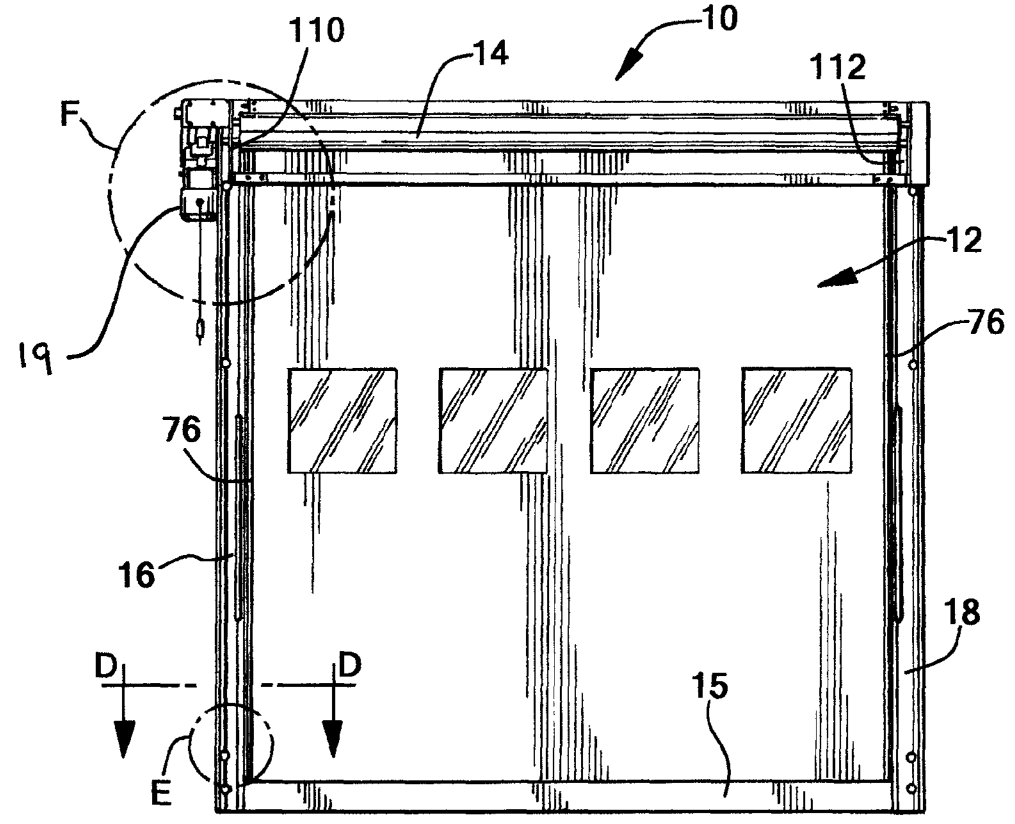
FIG. 1A shows a door assembly according to an embodiment of the invention.
Figure 1B:
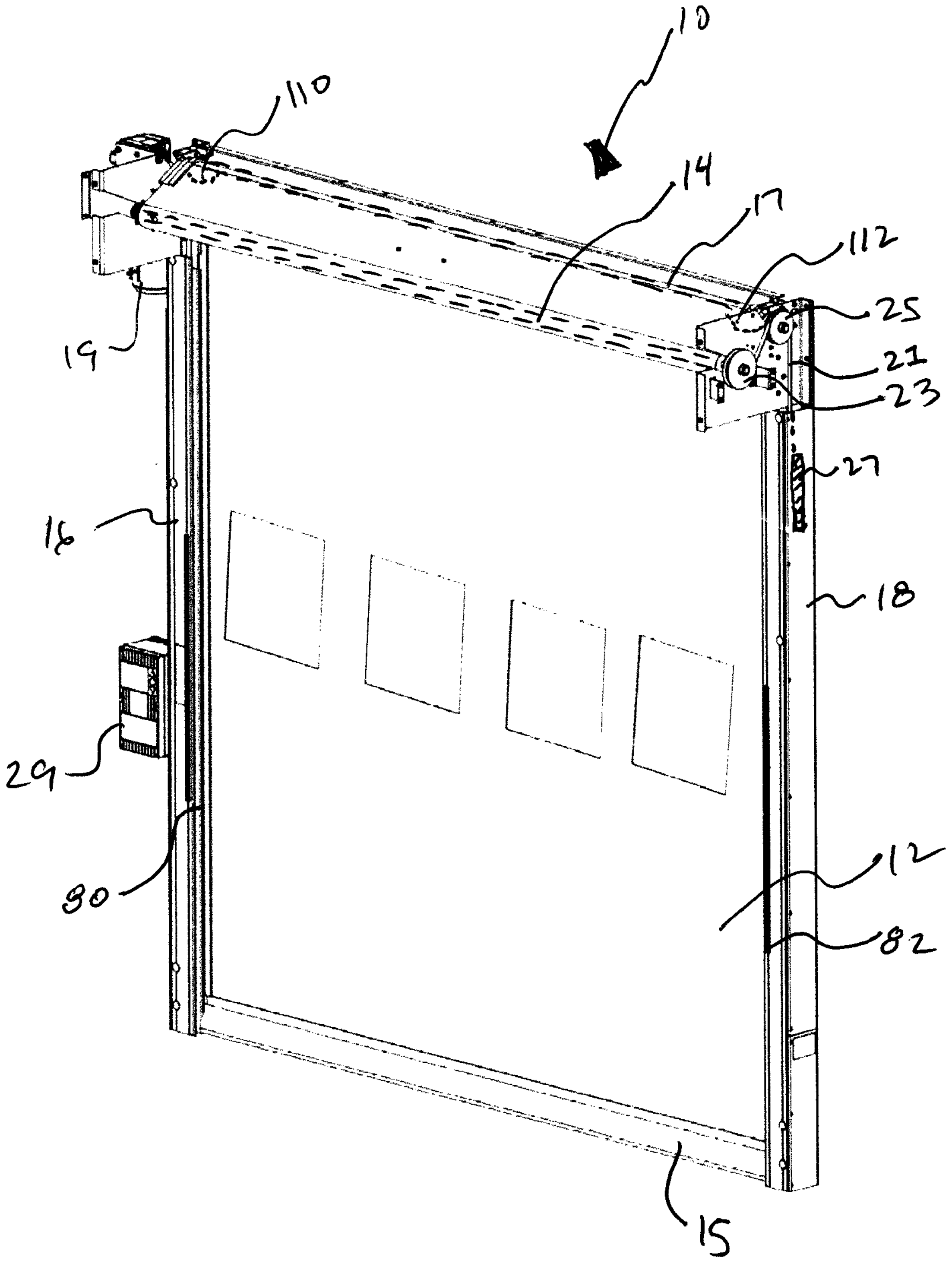
FIG. 1B shows a perspective view of the door assembly in FIG. 1A.

FIGS. 1A and 1B show an embodiment of a door assembly as contemplated by the present invention, with FIG. 1B showing a perspective view of the door assembly in FIG. 1A, with both FIGs. having a portion of the header removed to better see the drive elements of the door assembly. As seen in FIG. 1A, door assembly 10 includes a door panel 12 which has a top edge and/or a top portion attached to a drum 14 (shown in phantom), with the panel being wound and unwound from drum 14 to open and close the door, respectively. Positioned along the outer edges of doorway 15 (the bottom of which can be seen in FIGS. 1A and 1B) are side columns 16, 18 which include guide tracks 80, 82 for engaging and guiding the door panel as it is wound and unwound from drum 14. Drive sprockets or guide sprockets 110, 112 (shown in phantom in FIGS. 1A and 1B with drive sprocket 110 being more clearly seen in FIGS. 20-23) may be provided above each side column 16, 18 in order to facilitate the opening and closing of the door panel. The drive sprockets may be located above a respective side column 16, 18 to facilitate pushing and pulling the door panel in order to open and close the door, and as better seen in FIG. 1B, are connected by a second drum 17.

Drive sprockets 110, 112 and drum 17 may be attached to and driven by motor 19 in order to drive the door panel between the opened and closed position. Motor 19 may connect to one drive sprocket, drive sprocket 110 for example, by connecting a motor drive shaft directly with the drive sprocket, using a motor sprocket connected to a separate sprocket fixed to the drive sprocket or drum, or through the use of a combination of pulleys and belts or additional sprockets and chains connected to the motor and one or more of the drive sprocket or drum 17. Any force imparted on drive sprocket 110 is transferred to and imparted on drive sprocket 112 by drum 17 so that drive sprockets 110, 117 are driven and rotated at the same rate. Motor 19 may be configured to rotate in a first and second direction, with rotation in the first direction causing drive sprockets 110, 112 and drum 17 to rotate in a first direction to open the door panel, for example, and rotation in the second direction causing drive sprockets 110, 112 and drum 17 to rotate in a second direction to close the door panel.

In order to facilitate the rotation of drum 14 to wind and unwind the door panel as the door panel is opened and closed, as seen in FIG. 1B, counterweight 27 may be provided within the side column 18 and connected to drum 14 using strap 21. A first end of strap 21 may connect to a spool or pulley 23 at the end of drum 14. Strap 21 may then be guided around pulley 25, before connecting at a second end to a counterweight 27 housed within side column 18.

Drum 14 and drum 17 may be configured to rotate in the same direction when opening or closing the door panel, with strap 21 being wound about spool 23 and pulley 25 in a manner which accommodates this rotation. For example, if drive sprockets 110, 112 and drum 17 are rotated in a first, counterclockwise direction by motor 19 to wind up and open the door panel, drum 14 may be configured and attached to the door panel in a manner in which drum 14 rotates in the first, counterclockwise direction to wind up door panel 12 onto drum 14 and open the door. Conversely, as motor 19 rotates drive sprockets 110, 112 and drum 17 in a second, clockwise direction by motor 19 to unwind and close the door panel, the door panel may be attached to, and drum 14 configured in a manner such that, drum 14 rotates in the second, clockwise direction to unwind the door panel from drum 14 and close the door. Strap 21 may then be configured to wind on spool 23 in a direction opposite of that of door panel 12 on drum 14. Since spool 23 is connected and rotates in the same direction as drum 14, winding and unwinding strap 21 in the opposite direction of the door panel allows for the counterweight to raise as the door panel is lowered and lower as the door panel is raised.

In operation, motor 19 drives the second drum 17 having drive sprockets 110, 112 coupled thereto to open and close the door, rather than drum 14 on which the door panel is wound on to and unwound from. As such, when a signal to open door panel 12 is received by door controller 29, the door controller will activate motor 19 causing the drive sprockets 110, 112 and drum 17 to rotate in a first direction, for example the counterclockwise direction. As drum 17 rotates, drive sprockets 110, 112 raise the door panel to the open position, while counterweight 27 is lowered by the rotation of drum 17. Insofar as strap 21 connects counterweight 27 to spool 23 and attached drum 14 in a manner which causes drum 14 to rotate in the counterclockwise direction, door panel 12 is wound about drum 14 as the counterweight is lowered and unwound from spool 23 as the lowering of the counterweight causes drum 14 to rotate. Pulley 25 has no effect on the strap 21 as it is a free-movement pulley which is only moved by the strap coupled to the counterweight and spool 23. When door controller 29 then receives a signal to close door panel 12, or generates such a signal internally, door controller 29 will activate motor 19 to cause drive sprockets 110, 112 and drum 17 to rotate in a second direction, for example the clockwise direction. As drum 17 rotates, drive sprockets 110, 112 lower the door panel to the closed position, unwinding the door panel from drum 14. The force of the motor driving door panel 12 downwards causes drum 14 to rotate in the clockwise direction as the door panel is unwound from drum 14, and since spool 23 is coupled directly to and rotates with drum 14, this rotation causes strap 21 to re-wind on the spool 23 and consequently raises counterweight 27. In this sense, the motor is both rotating drive sprockets 110, 112 and drum 17 to lower the door panel, and providing the force to rotate drum 14 which is coupled to drum 17 by door panel 12, with the rotation of drum 14 raising counterweight 27. While being raised, counterweight 27 helps maintain a tautness in the door panel, as it provides some resistance to the clockwise rotation of drum 14 so that the door panel is unwound in a more controlled manner. Of course, the clockwise and counterclockwise directions can be reversed. Such is different from standard overhead roll-up door assemblies wherein the motor is typically used to drive the drum on which the door panel is wound to open the door panel.

A more detailed discussion is now had with respect to the elements of the door assembly. It should be understood that each vertical edge of the door panel and each side column, along with all accompanying elements such as guide tracks, columns of drive teeth, and drive sprockets are substantially identical on each side of the door assembly, with the primary exception being the combination of strap 21, spool 23, pulley 25, and counterweight 27 being associated on the side of the door assembly with side column 18, and motor 19 only being attached to drive sprocket 110. As such, while only one side column, guide track, vertical edge, drive sprocket, and column of drive teeth may be shown and discussed at times herein, it should be understood that the description applies, and that all similar elements are likewise found, with respect to the opposing side column, guide track, vertical edge, drive sprocket, and column of drive teeth located on the opposite side of door panel 12 and doorway 15 except where specifically noted.

Figure 2:
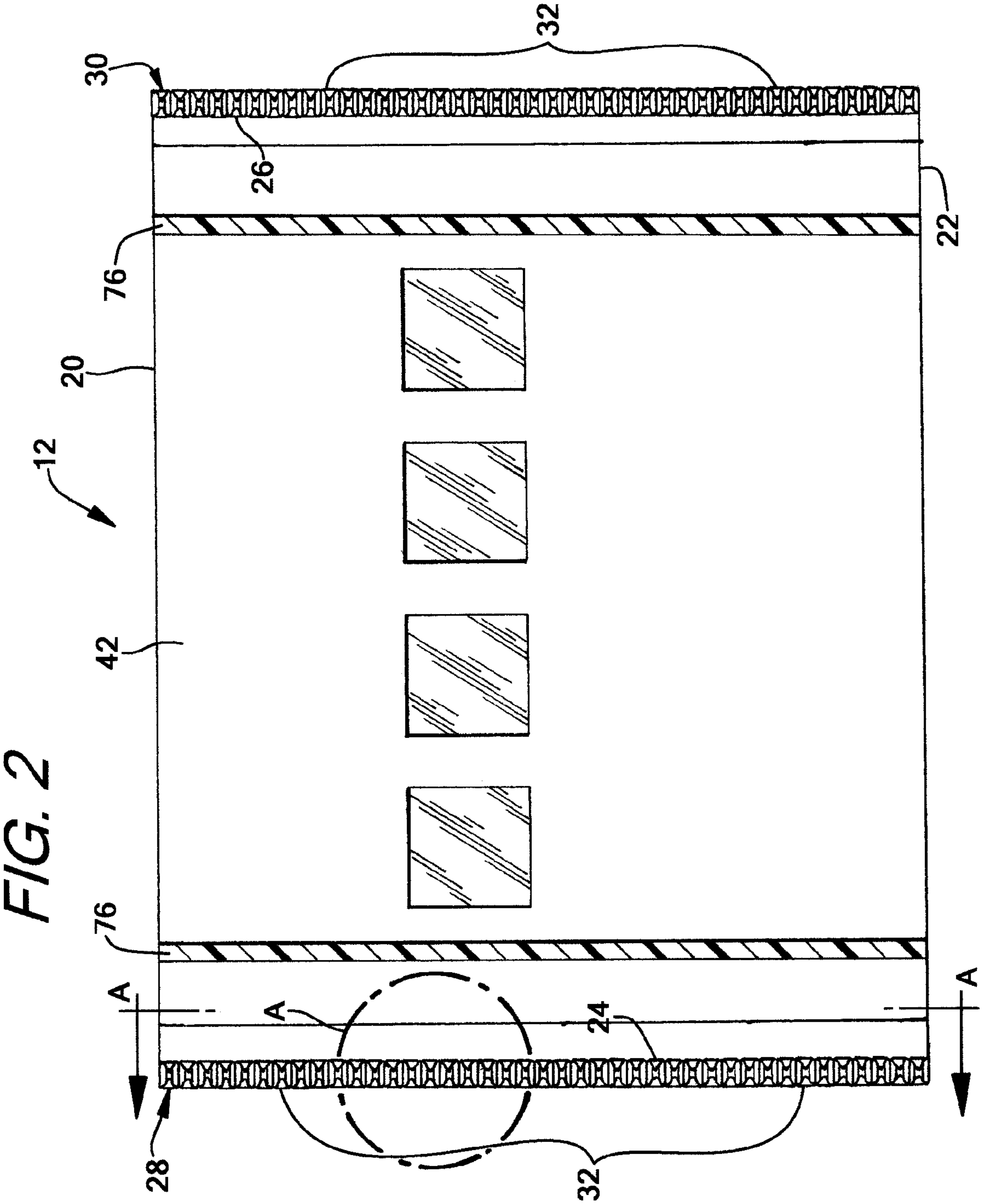
FIG. 2 shows an isolated, blown-up, front elevation of the door panel of the door assembly in FIG. 1A.

Door panel 12 can be more clearly seen in FIG. 2, which shows the door panel 12 from FIGS. 1A and 1B isolated and removed from door assembly 10. As is more clearly seen in FIG. 2, door panel 12 includes a top edge 20, a bottom or leading edge 22, and opposing vertical side edges 24, 26 which extend between the top edge and the bottom edge. The opposing vertical side edges extend into and are guided by the guide tracks within side columns 16, 18 when the door panel is integrated with a door assembly as in FIG. 1A and FIG. 1B. While top edge 20 is shown free in FIG. 2, it should be understood that when integrated with a door assembly, the top edge and/or some portion of the door panel proximate thereto may be fixed to drum 14 in order to keep the door panel attached to the drum and insure that the door panel winds and unwinds to open and close the doorway adjacent the door panel as necessary. As shown in FIGS. 1 and 2, No bottom bar or weighted element is attached to bottom edge 22. Instead, bottom edge 22 may be constructed or formed using the door panel material itself, a combination of door panel material and/or other fabric and/or other light weight or non-weighted and non-rigid material, and/or may include a cord or wire cable. Regardless of how bottom edge 22 is formed, the bottom edge will lead the door panel as it is closed, for example, and contact the floor or bottom edge of the doorway when in the door panel is in the fully closed position.

In order to facilitate the driving of the door panel and help insure it stays aligned and taut within the guide tracks as the door panel opens and closes when it is integrated with a door assembly, and insure engagement with the drive sprockets at the top of or above the side columns so that the door panel is moved as the guide sprockets rotate, aligned along each opposing vertical side edge of the door panel are columns of drive teeth 28, 30, each of which include a plurality of individual drive teeth 32. As the door panel opens and closes, these drive teeth engage drive sprockets 110, 112 in order to enhance the rigidness of the door panel and facilitate opening and closing of the same.

Though each of the columns of drive teeth 28, 30 are shown in FIG. 2 as extending substantially along the entirety of its respective vertical edge, such is not necessary in order to realize the advantages of the present invention. It is contemplated that each column of drive teeth may stop short of top edge 20, and may, for example, only extend along a substantial portion of the vertical edge and not extend to some portion of the door panel which extends above the side columns when the door panel is fully closed. When drive sprockets or drive gears 110, 112 are incorporated into the drive assembly above the side columns and guide tracks, as is shown in FIGS. 1A, 1B, and 20-23 for example, the drive tooth columns may extend beyond the side columns and guide tracks to the drive sprockets or gears when the door panel is fully closed, but may only extend beyond the drive sprockets or gears a short distance, i.e. one or two teeth beyond the number of teeth required to maintain engagement of the drive tooth column with the drive sprocket or gear when the door panel is fully closed. In such embodiments, the remainder of each vertical edge of the door panel between the few teeth located above or past the drive sprocket and the top edge of the door panel may not have any drive teeth engaged therewith.

The alignment of the adjacent drive teeth can be better seen in FIGS. 3-6 which show various views of portion A of door panel 12 in FIG. 2. Though only portion A of the door panel and drive tooth column 28 is shown, it should be understood that the depiction of the drive tooth column and vertical side edge elements in portion A is identical along the entirety of both columns of drive teeth 28, 30, and substantially along both opposing vertical side edges 24, 26 excepting any portion proximate the top edge of the door panel where no drive teeth may be engaged.

As seen in FIGS. 3-6, each individual drive tooth 32 includes an upper portion 34 and a lower portion 36, with the upper and lower portion of adjacent drive teeth in the drive tooth column abutting and/or pushing on each other. As seen in FIG. 5 (a cross-sectional view of portion A taken along A-A in FIG. 2) and FIG. 6 (an outside view of the vertical edge and drive tooth column of portion A in FIG. 2), the upper portion 34 and lower portion 36 of each drive tooth includes a flat portion (34*a*, 36*a* respectively), and an angled portion (34*b*, 36*b* respectively). For at least any portion of the door panel which is closed and vertically blocking doorway 15 (and for which that portion of the vertical edge of the door panel extends into the guide track), a continuous, unbroken column of drive teeth is formed with adjacent flat upper portions 34*a* contacting the adjacent flat lower portions 36*a* in the chain. The continuous, unbroken columns of drive teeth have at least two primary effects on the door panel as it wound, unwound, or held in a partially or fully unwound or closed position.

The first effect of the continuous column of drive teeth along each vertical edge is that each drive tooth will provide a downward force on the drive tooth below it as the door panel is unwound from the drum or the door panel is closed, for example. This downward force may be transferred to the door panel, by virtue of the individual drive teeth being engaged therewith, to facilitate movement of the door panel when being unwound and help keep the door panel taut within the guide tracks as the door panel closes. The drive sprockets may enhance this downward force by engaging the respective drive tooth column and driving the drive tooth columns in the downwards direction as the sprockets are rotated. A similar upward force may be provided amongst adjacent drive teeth when the door panel is opened.

The second effect of the continuous column of drive teeth on each vertical edge is, if the individual teeth are properly configured, the column of teeth will enhance the rigidity and stiffness of the unwound portion of the door panel by, for example, preventing the door panel from being wound or bent in one direction, i.e. towards the non-toothed portion or in direction H in FIG. 5 as the abutting drive teeth will prevent flexing of the column in that direction.

An exemplary configuration of each individual tooth which helps facilitate these effects and engagement with the drive sprockets can be seen, for example, in FIGS. 3-7 and in FIGS. 8-12 which show various views of an isolated drive tooth. As seen in each of FIGS. 3-7 and more clearly seen in FIGS. 8-12, each individual drive tooth 32 includes a toothed portion 38 and a non-tooted portion 40, both of which extend between upper portion 34 and lower portion 36 of each drive tooth. In order to facilitate the winding of the door panel and realize the enhanced effects of the drive tooth columns when the door panel is partially or fully closed, each drive tooth should be arranged on its vertical edge of the door panel such that the toothed portion of each drive tooth extends in the same direction, i.e. away from a first side 42 of the door panel 12 (see FIG. 3 for example), while the non-toothed portion of each drive tooth extends in the same direction, i.e. away from a second side 44 of the door panel (see FIG. 4 for example).

Each toothed portion 38 includes a tooth 46 extending about the outside surface of the drive tooth and being surrounded on the top and bottom with recesses 48, 50, with the remainder of the drive tooth between the upper portion 34 and the lower portion 36 being the non-toothed portion. By providing recesses 48, 50 on the toothed portion of each drive tooth, each drive tooth column can more easily mate with any drive sprocket used to drive the door panel opened and closed.

In order to further facilitate winding about the drum, the angled portions 34*b*, 36*b* of each of the upper and lower portions 34, 36 may be angled from the flat portion 34*a*, 36*a* towards the toothed portion 38 and tooth 46 of each drive tooth 32. To create more space and permit greater flexibility within for winding the columns of drive teeth, the upper angled portion 34*b* and the lower angled portion 36*b* may begin at an upper or lower pivot point 34*c*, 36*c*, respectively, with a pivot point 52 between adjacent teeth being formed where the angled portion meets the respective flat portion 34*a*, 36*a*. From each respective pivot point 34*c*, 36*c*, each of the upper and lower angled portions are angled towards tooth 46—for example upper angled portion 34*b* extends from upper pivot point 34*c* "downwards" towards tooth 46, while lower angled portion 36*b* extends from lower pivot point 36*c* "upwards" towards tooth 46. By providing angled upper and lower portions on each drive tooth in the column, gap 54 is created between the toothed portion of each adjacent drive tooth in the drive tooth column for teeth which are within the guide track. As each drive tooth column is flexed as the door panel is wound up as seen in FIG. 7 (or driven by a drive tooth gear as explained herein and shown in FIGS. 21 and 22), the gap between each adjacent drive tooth in any portion of the drive tooth column which is flexed is collapsed, with adjacent drive teeth pivoting about pivot points 34*c*, 36*c* so that angled portions 34*b*, 36*b* in adjacent teeth are brought into contact or at least close proximity as seen in FIG. 7, for example. With adjacent drive teeth pivoting about the respective upper and lower pivot points to bring the angled portions in contact, the flat portion 34*a*, 36*a* of adjacent upper and lower portions 34, 36 of adjacent drive teeth 32 are separated, creating a wound gap 56 between the adjacent flat portions when the door panel and drive tooth column is flexed, as seen in FIG. 7.

The degree of angling of the angled portion from the respective pivot points to the toothed portions, as well as the position of the pivot points along the upper and lower portions of each tooth can be manipulated in order to enhance the flexibility or rigidity of the drive tooth columns (and consequently the door panel) as desired. For example, the angled portions may extend from the respective pivot point towards the tooth at a 15° angle with respect to the respective flat portion, with the angle being increased in order to increase the flexibility or amount of flex of the drive tooth column, or the angle decreased in order decrease the flexibility or the total amount of flex (and increase the rigidity) of the drive tooth column.

Additionally, or alternatively, the pivot points may be moved along the upper and lower portions of each drive tooth to change the ratio of the flat portion to the angled portion of each drive tooth in order to enhance rigidity or flexibility of the drive tooth column. For example, moving each pivot point closer to the toothed side will change the ratio of the flat portion to the angled portion to create a larger flat portion of each upper and lower portion of each drive tooth, resulting in a stiffer drive tooth column (and therefore stiffer door panel). Conversely, movement of the pivot away from the toothed side will result in a higher ratio of angled portion of the upper and lower portions of each drive tooth, resulting in a more flexible drive tooth column (and therefore a more flexible door panel).

Of course, teeth having different pivot points may be utilized within the same drive tooth column. For example, drive teeth engaged closer to the top of the door panel may be configured so that the drive tooth column in this portion of the door panel is more flexible, by for example, providing a larger angle or longer angled portion to promote flexibility of the top, tightest wound portion of the door panel. By contrast, drive teeth engaged closer to the lower portion of the door panel may be configured so that the drive tooth column in this portion of the door panel is more rigid to enhance wind load or pressure differential resistance at the lower portion of the door panel.

In order to fit around the edge of the door panel, each drive tooth 32 may include an opening 58 which provides access to a horizontal or radial channel 60 which extends from an outer surface 62 of the drive tooth to an interior portion or interior channel 64 as can most easily be seen in FIGS. 9-12. Horizontal or radial channel 60 may be narrower than the vertical edge of the door panel and any element associated therewith, with the interior channel 64 being configured to have a dimension which substantially matches the width or diameter of the outer edge of the door panel or any elements fixed thereto. Both the horizontal or radial channel and the interior channel are configured to extend along the entire vertical length of the drive tooth.

By providing a horizontal or radial channel which is narrower than the vertical edge of the door panel or any associated elements, it is contemplated that each drive tooth may pinch a portion of the door panel proximate the vertical side edge in order to help hold the drive tooth in place. Alternatively, or in addition to pinching, as seen in FIGS. 3, 4, and 16, for example, a Keder 68 having a thickened longitudinal element 66 such as a PVC or steel cable may be provided along, or be formed as, each vertical edge of the door panel. Where a thickened longitudinal element is provided, opening 58 and horizonal or radial channel 60 may be sized so as to be wide or open enough to accept the thickness of the door panel 12, while being narrower than the thickened longitudinal element. Interior channel 64 may be sized to accept and substantially match the circumference or perimeter of the thickened longitudinal element.

An isolated Keder can be seen in FIGS. 13 and 14, with the Keder being removed from portion A of the door panel in FIG. 2, for example. As seen in FIGS. 13 and 14, Keder 68 includes a sheet body 69 wrapped around elongated body 66. Flaps 69*a* and 69*b* which extend beyond the elongated body 66 can be fixed to door panel 12 using one or more of adhesive, stitching, or any other fastening means to fix the Keder in place. One Keder may be attached to each edge of the door panel, with the Keder forming the outer most edge of the door panel, and each drive tooth column attaching to the Keder and door panel in order to fix each column in place.

Utilizing a thickened longitudinal element like a Keder along each vertical edge of the door panel, or as the outer most vertical edge of the door panel, has the advantage of stabilizing the individual drive teeth and the drive tooth columns insofar as the Keder provides an element having a constant length to which the drive teeth can be anchored to individually. As the door panel is wound and unwound from the drum, for example, the door panel material may flex and stretch or contract causing adjacent teeth in the drive tooth column to separate, creating gaps in the column where one or more adjacent teeth no longer abut each other. The separation of teeth may not only cause the door panel to lose rigidity as there will be one or more portions where the panel becomes more flexible, but also when used with a drive sprocket as discussed further herein, the tooth of adjacent drive teeth may get out of synch or misaligned causing the drive sprocket and drive tooth column to mis-engage or disengage altogether. Providing a Keder having a fixed length, thickened longitudinal element which will not stretch and contract as the door panel winds and unwinds helps maintain the alignment of the drive teeth, preventing the teeth from separating or misaligning with any drive sprocket.

A Keder having a thickened longitudinal element also provides an anchor to which one or more drive teeth may be fastened using a fastener 70 to hold one or more, or all, of the individual drive teeth in a relatively constant position relative to one another and the vertical side edge of the door panel, as seen in FIG. 4, for example. Where fasteners are used, as seen in FIGS. 10 and 11, for example, each drive tooth which is to be fastened to the door panel or Keder may include a fastener opening 72 in the non-toothed portion of the drive tooth, and have a third internal channel, fastener channel 74, into which the fastener extends once engaged with the drive tooth. The fastener channel may merely extend a portion of the way into the tooth and end before reaching the thickened longitudinal element, or may extend through a majority of the drive tooth and allow the fastener to pinch against or extend into or through the thickened longitudinal element, as seen in FIG. 10. The number of drive teeth which are fastened may be one or all of the teeth, and may be based upon the location of the door assembly. For example, door assemblies located in areas with high traffic or wind loads, or which may be subject to large pressure differentials on opposing sides of the door panel, may have a high number or all individual teeth fastened to the door panel and/or Keder. Doors in low traffic or wind load areas, or which are not subject to pressure differentials, may instead have only a few individual teeth fastened to the door panel, for example one tooth every 12 inches or every fifth or tenth tooth.

Though the individual drive teeth in FIGS. 3-12, 15, and 16 are shown to be substantially cylindrical or spherical with a top and bottom portion removed, i.e. having a flat/angled top and bottom with a rounded middle, it is contemplated that the individual drive teeth may take any form. It is preferable, however, that at least the non-toothed portion hads some curvature, be it spherical or cylindrical in nature or round, ovular, or the like, in order to help enhance the breakaway ability of the door panel if the door is impacted, as well as to reduce friction created by the drive tooth columns within the guide tracks and any drive tracks as the door panel is opened and closed. As explained herein, the breakaway ability and friction reduction can be further realized by providing a guide track which is flexible and/or provides a mating curved surface on the interior to receive and engage the drive teeth as seen in FIGS. 15 and 16, for example. The drive teeth may also be made of a low friction material, such as acetal with a silicon additive to further reduce friction.

In addition to any thickened longitudinal elements which are attached to the outer vertical edges of door panel 12, as seen in FIGS. 1A, 1B, 2, and 15, for example, the door panel may further include two longitudinal strips of material 76 attached proximate each vertical edge, with one strip 76 being adhered to first side 42 of the door panel proximate each vertical edge and a second strip 76 being adhered to second side 44 of the door panel. These strips of material may extend from substantially the top edge to the bottom edge in a manner such that they overlap each other on opposite sides of the door panel, and, along with the door panel, have a combined thickness greater than the thickness of each individual drive tooth. Providing two opposing strips of material which have a combined thickness with the door panel greater than the thickness of the drive teeth creates a surface on which the door panel can roll rather than rolling on the drive teeth. Rolling on strips of material rather than the drive teeth keeps the panel roll concentric, and prevents the drive teeth from damaging each other or the drive tooth column becoming warped, by drive teeth contacting and resting on each other in the rolled or wound position.

In order to prevent jamming and sticking within the guide tracks as the door panel is opened and closed, particularly toothed portion 38, the exterior edge 34*d*, 36*d* of upper and lower surfaces 34, 36 of each drive tooth 32 may have a rounded or chamfered edge as seen in FIGS. 3-7, 11, and 12 in particular. Furthermore, the arc along the back portion 36*e* of each tooth promotes engagement with the guides and prevents jamming and damage to the same. The arc along the non-toothed portion of each tooth mates with the curvature of the guides in order to prevent jamming and unwanted friction.

The side columns and guide tracks of the door assembly 10 for guiding door panel 12 and drive tooth columns 28, 30 between the open and closed position can be seen in FIG. 15 which is a cross section of side column 16 taken along the line D-D in FIG. 1A. Again, though side column 16 and the accompanying guide track will be discussed herein, it should be understood that side column 18 is of similar construction, albeit with a housing and channel for the counterweight, and otherwise includes the same design elements and features as side column 16. For example, as seen in FIGS. 1A and 1B, side columns 16, 18 each include a guide track 80, 82 respectively, with each guide track being of identical construction. As such, the description of guide track 80 and the engagement of vertical edge 24 and drive tooth column 28 provided herein applies equally to guide track 82, vertical edge 26, and drive tooth column 30.

Guide track 80 and drive teeth 32 may be configured to form a ball and socket like interface as seen in FIG. 16. This configuration may be accomplished by providing drive teeth which have a curved outer surface, such as a spherical or cylindrical or rounded body and providing a guide tracks which have a first track 80*a* and a second track 80*b* which together form a c-shaped guide track. Each track 80*a*, 80*b* of guide track 80 may include a first portion 84*a*, 84*b* respectively, which extends laterally towards the doorway and a curved second portion 86*a*, 86*b* respectively, which extends from the first portion towards the opposing track. The curved second portions each stop short of each other, defining a gap 88 through which door panel 12 extends from doorway 15 into the guide track, with the combination of tracks 80*a*, 80*b* further defining a guide channel 90 in which the column of drive teeth 28 and vertical edge 24 travels as the door panel opens and closes.

As seen in FIGS. 15 and 16 which is a close up view of guide track 80 in FIG. 15, the interior portion of the curved second portion 86*a*, 86*b* of each track may include a curved seat 92*a*, 92*b* respectively which is configured to mate with the curvature of the drive teeth 32, forming a ball and socket like arrangement. By providing a ball and socket like configuration, any friction resulting from the drive teeth engaging the guide track may be substantially reduced as, for example, a wind load or pressure differential is applied to one or both sides of the door panel causing the door panel to bow in one direction and the drive teeth to engage the guide tracks to hold the door panel in place and not be blown out of the tracks. With each drive tooth having a round or curved profile, and each track of the guide tracks having a mating curvature, the drive teeth can freely rotate within the guide channel while engaged with the drive track in response to changes in the wind load or pressure differential on the door panel, as seen in FIG. 16.

The ball and socket like configuration is particularly advantageous when opening or closing the door panel under a wind load or pressure differential as the configuration not only reduces friction on the drive teeth and side column, but also prevents the drive teeth from becoming jammed in the gap formed by the tracks as the door opens or closes under a wind load or pressure differential. The ball and socket like configuration has the advantage over known systems, like for example the thickened bodies discussed herein, or laterally positioned cylindrical bodies which have the "top" flat edge engaging the guide tracks rather than a rounded middle portion, insofar as the rounded body can freely rotate in the matching side column and avoid edges or bodies which may become wedged within the gap in the side column, potentially jamming the door panel which increases friction and potentially damaging the door panel, wind lock, motor and/or guide track.

A further advantage of using a ball and socket like configuration is that the configuration helps prevent the drive teeth from disengaging from the vertical edges of the door panel under increased wind loads or pressure differentials, or in the event that the door panel is impacted and is required to break away from the guide tracks and side column. As a result of the ball and socket like configuration, as the wind load force on the door panel (and consequently the drive teeth) increases, or a breakaway force is applied to the door panel requiring the panel to break away from the guide tracks, the inward catenary tension on the panel pulls the drive teeth towards gap 88 formed in guide track 80, and into engagement with the guide tracks. The reaction forces of the guide track and specifically second portion 86*a*, 86*b* of the tracks (as seen in FIG. 16 for example), pushes back on the exterior surface of drive teeth 32 in a way which causes the drive teeth to pinch down against door panel 12 and any longitudinal element 66 positioned in or coupled to the vertical edge 24 of the door panel. As each drive tooth engages its respective track, for example, opening 58 and channel 60 of the drive tooth will clamp down on door panel 12 and/or Keder 68, enhancing the engagement between the teeth and the door panel and/or Keder to prevent teeth from breaking off or disengaging from the door panel. When a breakaway of the door panel is required, the clamping of the drive teeth helps maintain engagement of the drive teeth with the door panel, and reduces the size of the door panel and drive tooth columns, in order to make it easier for the door panel and drive tooth columns to pass through gap 88 and disengage from the side columns. The clamping of the drive teeth may also eliminate the need to fasten or fix each tooth to Keder or door panel insofar as the pinching will prevent the drive teeth from disengaging from the door panel when disengaging from the side column when an impact on the door panel occurs. Using a rounded shape for the drive teeth further helps maintain the engagement insofar as there are no edges or corners which can catch on the side columns and be pulled off the door panel.

Figure 20:
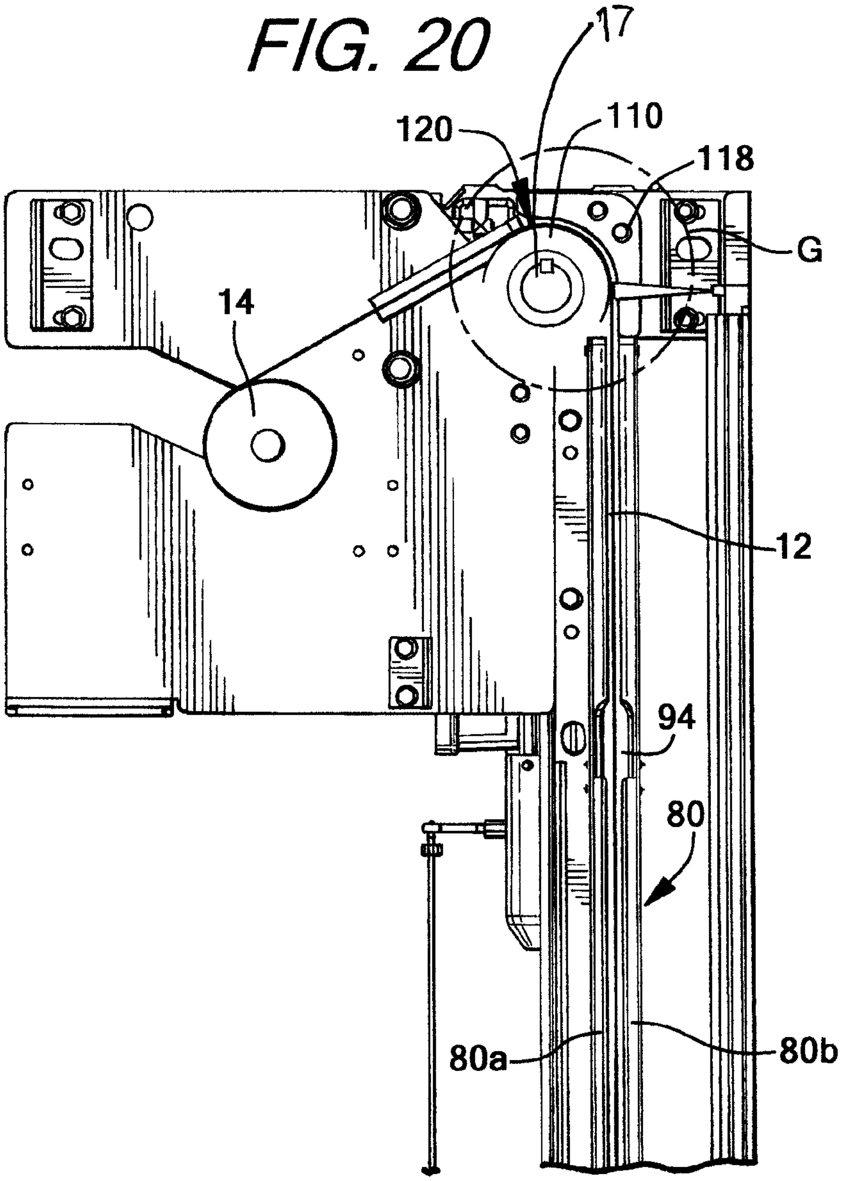
FIG. 20 shows an interior side view of portion F of the door assembly shown in FIG. 1A.

Furthermore, when a breakaway of the door panel from the guide tracks occurs as a result of a break away force being applied to the door panel, like for example a vehicle impacting the door panel, the ball and socket like configuration and continuous drive teeth chains makes resetting of the door panel easier. While each guide track 80, 82 may include a discontinuity 94 for a disengaged vertical edge and associated drive tooth column to reenter the guide tracks proximate the top of the guide tracks as seen in FIG. 20, the ball and socket like_configuration along with the continuous nature of each drive tooth column allows for the door panel and drive teeth to reenter the guide track at the point of disengagement from the track, i.e. where the door panel broke away from the guide track. Rather than having to open the door panel all the way to facilitate reinsertion of the door panel into the guide tracks, the drive teeth and guide track of the present invention may provide for complete reinsertion without fully opening the door panel, only having to open the door panel to the height where the column of drive teeth and door panel exited the guide track. The flexible nature of the guide tracks and the ball and socket like configuration allow for the guide teeth to simply pop back into the guide track where the lower most tooth remains engaged within the guide track after impact. By opening the door panel, as any disengaged portion of the drive tooth column reaches the disengagement point, the ball and socket like_configuration, along with the continuous nature of the drive teeth in the drive tooth column, will cause the drive tooth column and vertical edge of the door panel to re-enter the guide track and re-engage the side column.

Notwithstanding, in the event that the entire door panel becomes disengaged, or if a separation between drive teeth occurs to prevent the automatic refeed at the point of disengagement, as seen in FIG. 20, discontinuity 94 is provided proximate the top of each track which allows for the door panel and drive tooth columns to be reinserted in the guide tracks as the door panel is moved to a fully or substantially opened position.

In order to control the disengageability and the wind load resistance or pressure differential resistance of door panel 12 in guide tracks 80, 82, it is contemplated by the invention that the guide tracks and guide track material may be altered to meet specific specifications of a particular environment. For example, where a lower wind load/pressure differential resistance but a higher disengageability is required, in an indoor setting with high traffic for example, the guide tracks may be made more flexible from top to bottom to allow for the drive tooth columns and door panel to more easily disengage from the guide tracks. Where a higher wind load/pressure differential resistance but a lower disengageability is required, in an outdoor loading dock setting for example, the guide tracks may be made less flexible and more rigid to better prevent the drive tooth columns and door panel from disengaging from the guide tracks.

Figure 17:
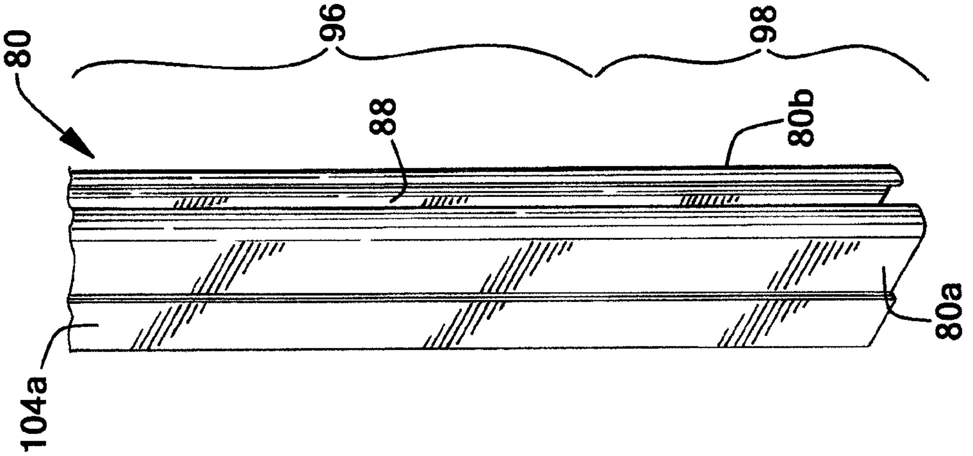
FIG. 17 shows a perspective view of an embodiment of portion E of the side column and guide track shown in FIG. 1A.

While the guide tracks may be uniform along the entire height of each side column, where both disengageability and high wind load/pressure differential resistance are required, it is contemplated that the guide tracks may have different levels of rigidity at different points in the tracks. For example, as seen in FIG. 17 which shows and embodiment of portion E in FIG. 1A of guide track 80, it is contemplated that a majority of the tracks 80*a*, 80*b*, portion 96 and above as shown in FIG. 17, may be more flexible, while a bottom portion of tracks 80*a*, 80*b*, portion 98 and below for example, may be more rigid. Portion 98 may be, for example, the bottom 12-36 inches of each track with portion 96 being the remainder of the guide track. By making the majority of the tracks more flexible, the door panel is better able to break away from the guide tracks throughout most of the opening/closing or winding/unwinding sequence if impacted by a break away force. By providing a more rigid portion of each track proximate the bottom of the doorway, the door panel can be better locked in place with a higher wind load or pressure differential resistance as the door panel approaches and reaches its final closed position, where the wind load or pressure differential load on the door panel becomes the highest as a result of a greater surface area of the door panel being exposed. The end of the closing sequence as the door approaches the fully closed position is also where the likelihood of an impact becomes the lowest, as the door panel is more visibly blocking the doorway, reducing the possibility of an accidental impact of the door panel.

Changes in the flexibility/rigidity within a single guide track may be accomplished using various methods. For example, the guide tracks may be formed by using multiple materials to extrude each track of the guide tracks. Rather than use separate materials, it is contemplated that additive may be added to one or both portions of the tracks to adjust the flexibility and/or rigidity of the guide track in that particular section of the guide track.

Figure 18:
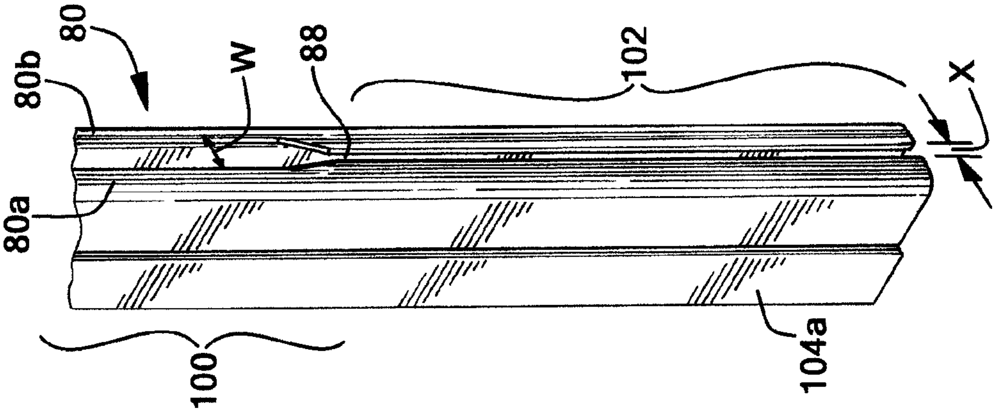
FIG. 18 shows a perspective view of an embodiment of portion E of the side column and guide track shown in FIG. 1A.

It is also contemplated by the invention that in addition to providing different levels of flexibility, the configuration guide track 80 (and 82) may be changed in different portions of the guide track. For example, gap 88 formed between the curved or second portions 86*a*, 86*b* of each track may be adjusted as desired. For example, as seen in FIG. 18 which is a second potential embodiment of portion E in FIG. 1A, a majority of the guide track 100 (and above) may have a first gap width W, while a second smaller portion 102 proximate the bottom of the guide track, like for example the bottom 12-36 inches, has a reduced or narrower gap X. The reduced or narrower gap has the effect of keeping the drive tooth column engaged within the guide track by making it more difficult for the drive teeth and the drive tooth column to escape through the gap.

In addition to adjusting the flexibility/rigidity of the guide tracks themselves, guide track holders which are more rigid than the guide tracks may be provided as part of each of side columns 16, 18. As seen in FIG. 15, for example, a guide track holder 104 having a first track holder 104*a* and a second track holder 104*b* may be fixed to tracks 80*a*, 80*b*, respectively. The track holders may be made out of material more rigid than the guide tracks in order to reinforce and prevent flexing of the guide tracks along some portion of portion 84*a*, 84*b* of each track along the portion the holder extends.

For example, tracks 80*a*, 80*b* may be made from UHMW plastic or polymers with track holders 104*a*, 104*b* being constructed from metal, steel, aluminum or the like. Where high flexibility is required, it is contemplated that the track holders may only extend laterally across the first portion 84*a*, 84*b* of each track a very short distance, allowing a majority of each first portion of the flexible the tracks to flex easier so that the gap can be expanded and the door panel allowed to disengage therefrom. When extending only a short distance, the track holder provides some rigidity to the base of each track of the guide track, but primarily acts as a holder or anchor and mount to couple the guide track to the side column 16, 18.

Where greater rigidity guide track is required, for example where a heightened wind load resistance and low traffic occurs, track holders 104*a*, 104*b* may extend laterally a greater distance along the first portion 84*a*, 84*b* of each track 80*a*, 80*b*, so that guide track 80 is less flexible. The track holders may extend, for example across a majority of each first portion 84*a*, 84*b* in order to prevent the first portion from flexing to help maintain the size of gap 88 so that the door panel and drive tooth column cannot escape from the guide track without a large force impacting the door panel.

Figure 19:
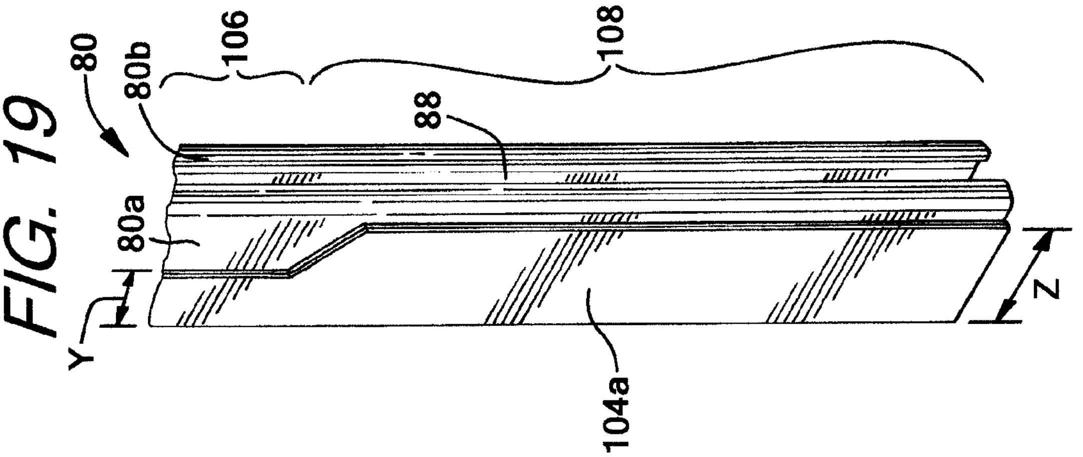
FIG. 19 shows a perspective view of an embodiment of portion E of the side column and guide track shown in FIG. 1A.

The track holders may extend across a uniform amount of each track, as seen in FIG. 19 which is yet a further embodiment of portion E of FIG. 1A, however, the track holders 104*a*, 104*b* may also extend laterally across a different amount of each first portion 84*a*, 84*b* of each track 80*a*, 80*b* at different portions of each track. For example, along a majority of the first portion 84*a*, 84*b* of each track 80*a*, 80*b*, portion 106 (and above), track holders 104*a*, 104*b* may extend laterally a first distance Y, while along a second smaller portion 108 (and below) proximate the bottom of each track 80*a*, 80*b*, like for example the bottom 12-36 inches of the guide track, track holder 104*a*, 104*b* may laterally across a second distance Z which is greater than the first distance Y. As with making the guide tracks themselves more rigid in the bottom portion of the guide track, by utilizing track holders which extend laterally across each track a greater distance proximate the bottom of the of each track, the door panel can be better locked in place with a higher wind load resistance as the door panel approaches and reaches its final closed position as the track holders will provide extra rigidity to the guide tracks where the wind load on the door panel becomes the highest as a result of a greater surface area of the door panel being exposed and the likelihood of an impact on the door panel becomes the lowest.

In order to drive the door open and closed and enhance stiffness of the door panel, as seen in FIGS. 20 (interior view of portion F from FIG. 1A) and 21 (close up of portion Gin FIG. 20), guide sprockets or drive sprockets may be positioned proximate the top of each guide track. Though discussed with respect to one side of the door assembly, it should be understood that an identical guide sprocket/drive channel combination may be present on the opposing side of the door assembly, with the differences being a motor being attached to only one drive sprocket and a pulley for facilitating the movement of the counterweight and strap being fixed to the opposing guide sprocket.

As seen in FIG. 21, guide or drive sprocket 110 is fixed to drum 17 and includes multiple sprocket teeth 114 separated by sprocket gaps 116 which mate with, and preferably match nearly identically or identically match, and are capable of engaging drive teeth 32. By engaging and rotating with each column of drive teeth, the respective drive sprockets drive the drive tooth columns and door panel up and down as the door panel is opened and closed. Each sprocket may be made as a single body, or in a clamshell configuration wherein the sprocket is two separate bodies joined together as one.

Each sprocket may be driven by the motor by virtue of the coupling of the sprockets by drum 17, with the rotation force received from the motor being imparted on the door panel and drive tooth columns by the drive sprockets and drive sprocket teeth. Each drive sprocket may also include a locking element to lock the drive sprocket in place and prevent rotation when the door is stationary and not being driven, like for example in the closed position. Such a locking mechanism may be utilized to prevent the door from being lifted or opened when closed, as the locked sprocket will hold engaged drive teeth in place and consequently hold the door panel in a static position. A locking mechanism may also provide enhanced safety for the door panel as the locking mechanism may engage if, for example, the motor fails. By locking the sprocket and consequently locking the drive tooth column and door panel in a partially open position as a result of motor failure, for example, the door panel is prevented from falling on individuals or objects located beneath the door panel. The locking mechanism may be, for example, a spring loaded or magnetic controlled bar or rod which locks the sprocket in place to prevent rotation. A motor brake or lock may instead be positioned on or in the motor to prevent rotation of the motor, and consequently the coupled drive sprockets and second drum.

In order to further prevent damage to the drive teeth, drive tooth columns, sprockets and sprocket teeth, it is contemplated that each tooth 46 of the individual drive teeth 32, and each sprocket tooth 114, as well as the gaps formed between each tooth by adjacent tooth recess 48, 50, and gaps 116 between each sprocket tooth, may be rounded in order to eliminate hard or sharp edges which may become jammed or caught on a surface. The angle between the sprocket teeth and/or sprocket gaps may be made to match to the angle of the angled portion of each drive tooth. For example, where the angled portion of each drive tooth is 15°, the angle $\alpha$ between each sprocket tooth as seen in FIG. 23 may likewise be 15° to match and facilitate engagement with the drive tooth chain and driving of the door panel and chain between the opened and closed positions. Matching the angle of the teeth has the added benefit of reducing the noise associated with the opening and closing of the door panel and the engaging and driving of the drive teeth by the drive sprockets. Each sprocket tooth/gap combination can be adjusted to match the drive tooth angle and/or pivot point position or the drive teeth engaged with the door panel in the door assembly to insure proper mating between the drive teeth in each drive tooth chain and the sprocket teeth and gaps in each drive tooth sprocket.

In order to facilitate engagement between the columns of drive teeth and the sprockets, as seen in FIGS. 20-22, each sprocket may be partially surrounded by a drive guide in which the drive tooth column is guided as it engages and is driven by the sprocket. As seen in FIGS. 21 and 22, each drive guide 118 includes a drive channel 120 which guides drive tooth columns 28, 30 and drive teeth 32 around the drive sprockets 110, 112. The drive channel 120 has a first portion 122 and a second portion 124 with a narrower middle portion 126 extending therebetween. The channel within first portion 122 and second portion 124 include clearances 128 which make those portions of drive channel 120 wider than the middle portion 126. Clearances 128 provide room for the individual drive teeth 32 to deflect if any drive tooth slides along the attached vertical edge of the door panel or otherwise move out of synch or out of alignment with the mating sprocket teeth 114 and sprocket gaps 116. Rather than forcing the drive teeth into misalignment with the sprocket and sprocket teeth, potentially damaging the drive guide, one or more drive teeth, the door panel and/or the sprocket and any sprocket teeth, the clearance on each first and second portion of the drive channel allows for the drive tooth to transition into the clearance and slide into engagement with the next sprocket tooth and gap as the guide sprocket rotates. For example, as seen in FIG. 22, if a tooth 46 of a drive tooth 32 becomes aligned with a sprocket tooth 114 rather than a sprocket gap 116 when the door panel is opening or closing, the sprocket tooth can push the drive tooth into the clearance, and as the sprocket rotates and/or the drive tooth is moved along the narrowing channel towards middle portion 126, the tooth 46 may be pushed or slip into alignment with the next sprocket tooth gap 116 to facilitate driving the drive tooth column and door panel.

Where each drive tooth has a rounded non-toothed portion 40, like for example if each drive tooth is formed as a cylinder or sphere with the top and bottom portions clipped, each drive channel 120 may have a mating rounded shape. By matching the shape of the non-toothed portion of each tooth, the drive channel, if a tooth or teeth become misaligned, the potential for a tooth jamming or becoming damaged or damaging the drive guide and channel is greatly reduced. As seen in FIG. 21, it is also contemplated that the curve of each drive tooth may optionally be configured such that as the drive tooth column bends, an outer circle is formed by the outer non-toothed portions 36*e* of drive teeth engaged with the sprocket, with the outer circle being concentric with the drive sprocket. That is, the drive teeth may have a rounded, outer, non-toothed portion, with the drive teeth engaged with the drive sprocket within drive channel 120 forming a portion of a circumference of a circle which is concentric with the drive sprocket. A centerline through the middle of each drive channel 120 may likewise be concentric with this circle.

While in the foregoing there has been set forth preferred embodiments of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying claims.

What is claimed is:

1. A door assembly comprising:

a door panel having a top edge, a bottom edge, a first vertical edge and a second vertical edge, the door panel being fixed proximate the top edge to a drum, the drum being rotatable in a first direction and a second direction, wherein rotation in the first direction causes the door panel to wind onto the drum, and rotation in the second direction causes the door panel to unwind from the drum;

a first side column and a second side column, wherein the first side column is positioned proximate a first side of a doorway and the second side column is positioned proximate a second side of the doorway, the first side column and the second side column each comprising a guide track, each guide track being positioned to guide one of the first vertical edge or the second vertical edge of the door panel as it blocks and unblocks the doorway;

a first column of drive teeth positioned along the first vertical edge and a second column of drive teeth positioned along the second vertical edge, wherein each of the first column of drive teeth and the second column of drive teeth are formed by a plurality of adjacent drive teeth, each drive tooth in each plurality of adjacent drive teeth having a cylindrically shaped exterior and arranged in the first column of drive teeth or the second column of drive teeth so that a height of each cylindrically shaped exterior extends vertically along the first vertical edge or the second vertical edge of the door panel so at least a portion of a top of each cylindrically shaped exterior of each drive tooth abuts at least a portion of a bottom of any cylindrically shaped exterior of an immediately adjacent drive tooth as the door panel is wound and unwound from the drum;

wherein a portion of each cylindrically shaped exterior is removed to form an engagement tooth along the height of each drive tooth, the engagement tooth extending transverse to the height of the drive tooth.

2. The door assembly of claim 1 further comprising a first drive sprocket being positioned proximate a top of the first side column and a second drive sprocket positioned proximate a top of the second side column, wherein the first drive sprocket engages the engagement tooth of each drive tooth in the first column of drive teeth, and the second drive sprocket engages the engagement tooth of each drive tooth in the second column of drive teeth, as the door panel is wound and unwound from the drum.

3. The door assembly of claim 1, wherein each drive tooth in the first column of drive teeth and the second column of drive teeth includes a toothed portion comprising the engagement tooth, and a non-toothed portion, wherein the first column of drive teeth are arranged so that the toothed portion of each drive tooth is aligned on a first side of the door panel and the non-toothed portion of each drive tooth is aligned along the first vertical edge and on a second side of the door panel, and the second column of drive teeth are arranged so that the toothed portion of each drive tooth is on the first side of the door panel and the non-toothed portion of each drive tooth is aligned along the second vertical edge and on the second side of the door panel.

4. The door assembly of claim 3, wherein each drive tooth in the first column of drive teeth and the second column of drive teeth includes an opening formed in the outer surface of the drive tooth, the opening providing access to an open channel extending vertically through the drive tooth, the opening and vertical channel being configured to facilitate engagement of the each drive tooth with the first or second vertical edge of the door panel and allows the drive tooth to overlap the vertical edge and a portion of the door panel proximate the vertical edge.

5. The door assembly of claim 4, wherein the door panel further comprises two Keders, with a first Keder of the two Keders being positioned along the first vertical edge of the door panel and a second Keder of the two Keders being positioned along the second vertical edge of the door panel, each of the first and second Keders comprising a cable and a flap, the cable extending along the first or second vertical edge of the door panel, and the flap being fixed to the door panel proximate the first or second vertical edge, wherein the first column of drive teeth is configured to engage the first Keder and the second column of drive teeth is configured to engage the second Keder.

6. The door assembly of claim 1, wherein each drive tooth in the first column of drive teeth and the second column of drive teeth comprises a flat top portion and a flat bottom portion, the flat top portion of at least a plurality of drive teeth abutting the flat bottom portion of any adjacent drive tooth in the first or second drive tooth column when the door panel is substantially unwound from the drum.

7. The door assembly of claim 6, wherein an outer edge of the flat top portion and an outer edge of the flat bottom portion of each drive tooth is rounded.

8. The door assembly of claim 6, wherein each drive tooth in the first column of drive teeth and the second column of drive teeth further comprises an angled top portion and an angled bottom portion, the angled top potion of each drive tooth connecting to the flat top portion at a top pivot point, and the angled bottom portion of each drive tooth connecting to the flat bottom portion at a bottom pivot point.

9. The door assembly of claim 8, wherein the top angled portion and the bottom angled portion of each drive tooth extends at an angle to the respective flat portion from the respective pivot point towards the toothed portion of the drive tooth.

10. The door assembly of claim 9, wherein each of the first and second drive tooth columns comprise a plurality of gaps, each gap in the plurality of gaps being formed between the top angled portion and the bottom angled portion of two adjacent drive teeth in each drive tooth column when the door panel is substantially unwound from the drum.

11. The door assembly of claim 10, wherein at least a plurality of the plurality of gaps are closed and each of the top angled portion and the bottom angled portion of each adjacent drive tooth in each drive tooth column substantially abut each other when the door panel is substantially wound on the drum.

12. The door assembly of claim 2 further comprising a first drive guide and a second drive guide, wherein the first drive guide partially surrounds the first guide sprocket and facilitates engagement between the of the first column of drive teeth and the first guide sprocket, and the second drive guide partially surrounds the second guide sprocket and facilitates engagement between the second column of drive teeth and the second guide sprocket.

13. The door assembly of claim 12, wherein the first drive guide and the second drive guide each comprise a drive channel, each drive channel having a first recessed portion, a second recessed portion, and a narrowed portion, the narrowed portion being positioned between the first recessed portion and the second recessed portion.

14. The door assembly of claim 13, wherein the drive channel of the first drive guide is substantially aligned with the guide track of the first side column, and the drive channel of the second drive guide is substantially aligned with the guide track of the second side column.

15. The door assembly of claim 1, wherein the guide track of the first side column and the guide track of the second side column each comprise a first track and a second track, and the side column further comprises a track holder, each track holder comprising a first support and a second support, wherein the first support of each track holder is coupled to the first track of the guide track of the respective side column, and a second support is coupled to the second track of the guide track of the respective side column.

16. The door assembly of claim 15 wherein each track holder is made from a material more rigid than the first track and the second track.

17. The door assembly of claim 15, wherein the first track and the second track of each guide track extend laterally towards the doorway a first distance, and the first support and the second support of the track holder of each side column extends laterally towards the doorway a second distance, wherein the first distance is greater than the second distance.

18. The door assembly of claim 15, wherein the first track and the second track of each of the first and second drive tracks include a curved portion, the curved potion defining a gap through which the door panel extends from the guide track into the opening, the curved portion comprising a curved seat.

19. The door assembly of claim 18, wherein the curved seat matches a geometry of each cylindrically shaped drive tooth in the first column of drive teeth and the second column of drive teeth.

20. The door assembly of claim 19, wherein the matching geometry is a matching curvature.

21. The door assembly of claim 1, wherein the first guide track and the second guide track are constructed from flexible materials.

22. The door assembly of claim 21 wherein the first guide track and the second guide track are constructed using ultra-high molecular weight plastic or polymer.

23. The door assembly of claim 1, wherein each drive tooth in the first column of drive teeth and each drive tooth in the second column of drive teeth is fastened to the vertical edge of the door panel by a fastener.

24. The door assembly of claim 1, wherein each drive tooth has a rounded portion, the rounded portion of each drive tooth forming a portion of an outer edge of the first column of drive teeth or an outer edge the second column of drive teeth.

25. The door assembly of claim 1, wherein each drive tooth comprises an interior channel extending through the drive tooth and a fastener channel extending from an outer edge of a non-toothed portion of each drive tooth to an interior portion of each drive tooth, the fastener channel extending adjacent to an outer edge of the interior channel.

26. The door assembly of claim 25 further comprising an elongated body extending along each outer edge of the door panel and a plurality of fasteners, wherein

- the interior channel of each drive tooth in the first column of drive teeth engages the elongated body extending along the first vertical edge;
- the interior channel of each drive tooth in the second column of drive teeth engages the elongated body extending along the second vertical edge; and
- one fastener from the plurality of fasteners is inserted into the fastener channel of each drive tooth, the fastener being positioned to pinch against the elongated body extending through the interior channel of the drive tooth.

27. The door assembly of claim 1, wherein each drive tooth comprises

- a flat top portion;
- a flat bottom portion;
- a rounded non-toothed portion extending between the flat top portion and the flat bottom portion, wherein the combination of the flat top portion, the flat bottom portion, and the rounded non-toothed portion of adjacent drive teeth prevent the drive tooth column from flexing towards the rounded non-toothed portion.

28. The door assembly of claim 1, wherein a top of each drive tooth and a bottom of each drive tooth extends transverse to the first vertical edge or the second vertical edge, each extending vertically along the first vertical edge or the second vertical edge.

29. The door assembly of claim 1, wherein each drive tooth comprises

- a flat top portion, an angled top portion, and a top pivot point where the angled top portion meets the flat top portion;
- a flat bottom portion, an angled bottom portion, and a bottom pivot point where the angled bottom portion meets the flat bottom portion; and
- an interior channel for engaging the first vertical edge of the door panel or the second vertical edge of the door panel, wherein the top pivot point and bottom pivot point are positioned adjacent an edge of the interior channel.

30. The door assembly of claim 1, wherein each drive tooth comprises

- a first top portion and a second top portion;
- a first bottom portion and a second bottom portion,
- wherein, the first top portion and the first bottom portion of adjacent drive teeth contact each other in any portion of the first column of drive teeth or the second column of drive teeth extending in the first side column or the second side column, and the second top portion and the second bottom portion of adjacent drive teeth contact each other when wound about the drum.

31. A door assembly comprising:

- a door panel having a top edge, a bottom edge, a first vertical edge and a second vertical edge,
- the door panel being fixed proximate the top edge to a drum, the drum being rotatable in a first direction and a second direction, wherein rotation in the first direction causes the door panel to wind onto the drum, and rotation in the second direction causes the door panel to unwind from the drum;
- a first side column and a second side column, wherein the first side column is positioned proximate a first side of a doorway and the second side column is positioned proximate a second side of the doorway, the first side column and the second side column each comprising a guide track, each guide track being positioned to guide one of the first vertical edge or the second vertical edge of the door panel as it blocks and unblocks the doorway;
- a first column of drive teeth positioned along the first vertical edge and a second column of drive teeth positioned along the second vertical edge, wherein each of the first column of drive teeth and the second column of drive teeth are formed by a plurality of adjacent drive teeth, each drive tooth in each plurality of drive teeth abutting an adjacent drive tooth as the door panel is wound and unwound from the drum and including a toothed portion and a non-toothed portion, the non-toothed portion comprising
  - a first rounded portion which engages the first guide track or the second guide track when a wind load is applied to the door panel;
  - a second rounded portion which forms an outer edge of the door panel when engaged with a vertical edge of the door panel, wherein
  - the non-toothed portion of each drive tooth is circular along an outer surface of each drive tooth when a horizontal cross-section is taken of each drive tooth.

* * * * *